United States Patent
Ye et al.

(10) Patent No.: US 11,210,988 B2
(45) Date of Patent: Dec. 28, 2021

(54) GRAPHICAL INDICATOR

(71) Applicant: SONIX Technology Co., Ltd., Hsinchu (TW)

(72) Inventors: Zhen-Fu Ye, Hsinchu (TW); Yi-Hsuan Chen, Hsinchu (TW)

(73) Assignee: SONIX Technology Co., Ltd., Hsinchu (TW)

( * ) Notice: Subject to any disclaimer, the term of this patent is extended or adjusted under 35 U.S.C. 154(b) by 0 days.

(21) Appl. No.: 17/195,661

(22) Filed: Mar. 9, 2021

(65) Prior Publication Data

US 2021/0287582 A1   Sep. 16, 2021

(30) Foreign Application Priority Data

Mar. 13, 2020   (TW) ................................ 109108331

(51) Int. Cl.
*G09G 3/20* (2006.01)
*G06F 3/0484* (2013.01)
*G09G 5/10* (2006.01)

(52) U.S. Cl.
CPC ........... *G09G 3/20* (2013.01); *G06F 3/04847* (2013.01); *G09G 5/10* (2013.01)

(58) Field of Classification Search
CPC ... G09G 3/20; G09G 5/10; H04N 5/63; G06F 3/04847
See application file for complete search history.

(56) References Cited

U.S. PATENT DOCUMENTS

| | | | |
|---|---|---|---|
| 7,328,845 B2 | 2/2008 | Tsai | |
| 7,549,597 B2 | 6/2009 | Tsai et al. | |
| 7,967,217 B2 | 6/2011 | Yoshida | |
| 9,520,079 B2 * | 12/2016 | Fernandes | G09G 3/3406 |
| 9,894,370 B2 * | 2/2018 | Wang | H04N 19/37 |
| 2009/0302114 A1 | 12/2009 | Ao et al. | |
| 2013/0278834 A1 * | 10/2013 | Ma | H04N 21/23614 348/730 |
| 2015/0358500 A1 | 12/2015 | Lee et al. | |

FOREIGN PATENT DOCUMENTS

| | | |
|---|---|---|
| EP | 2618287 | 1/2017 |
| TW | 201137758 | 11/2011 |

* cited by examiner

*Primary Examiner* — Sejoon Ahn
(74) *Attorney, Agent, or Firm* — JCIPRNET

(57) ABSTRACT

A graphical indicator is provided. The graphical indicator includes a plurality of header blocks and a plurality content blocks. The header blocks include N first header blocks and (M−1) second header blocks. Each of the content blocks has a data micro-graphic. The N first header blocks are disposed at a first row of an indicator matrix. Each of the (M−1) second header blocks is disposed at (M−1) rows other than the first row of the indicator matrix. Each of the N first header blocks has a header micro-graphic. Furthermore, one or more target second header blocks in the (M−1) second header blocks do not have the header micro-graphic, and each of a plurality of remaining second header blocks other than the one or more target second header blocks in the (M−1) second header blocks has the header micro-graphic.

11 Claims, 17 Drawing Sheets

Graphical indicator of a MxN indicator matrix (for example, M=N=4)

Graphical indicator of a MxN indicator matrix (for example, M=5, N=4)

Graphical indicator of a MxN indicator matrix (for example, M=4, N=4)

Graphical indicator of a MxN indicator matrix (for example, M=5, N=4)

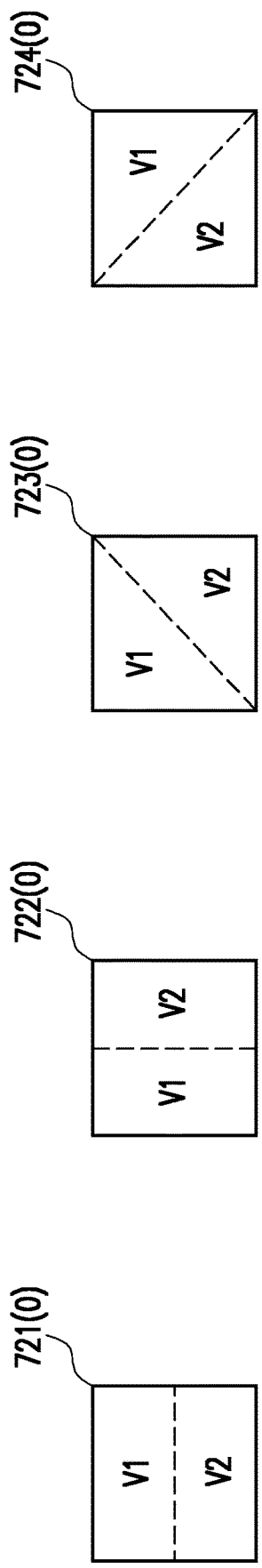

GRAPHICAL INDICATOR

CROSS-REFERENCE TO RELATED APPLICATION

This application claims the priority benefit of Taiwan application serial no. 109108331, filed on Mar. 13, 2020. The entirety of the above-mentioned patent application is hereby incorporated by reference herein and made a part of this specification.

BACKGROUND

Technical Field

The invention relates to a graphical indicator adapted to be read through pattern/image recognition, and the graphical indicator corresponds to indicator data.

Description of Related Art

Along with development of printing technology and electronic technology, a technique of hiding graphical indicators in visible text information or image information has been widely used in daily life. FIG. 1 is a schematic diagram illustrating coexistence of graphical indicators and main information drawn in accordance with the prior art. As shown in FIG. 1, a plurality of adjacent graphical indicators 102 are formed on an object surface 100. Each graphical indicator is composed of a plurality of micro-graphics (which are also referred to as graphical micro-units), since the micro-graphics are quite small, they are easy to be ignored visually, or interpreted as a background color by human eyes (not easy to be recognized by human eyes). The graphical indicators and the main information 104 (for example, a text pattern "APPLE" in FIG. 1) are jointly formed on the object surface 100 such as a paper, etc., through a method such as printing. The graphical indicator 102 may be regarded as indicator data coexisting with the main information without affecting reception of the main information 104 by the human eyes.

Therefore, to improve a framework a graphical indicator to increase a recognition rate of an image recognition operation performed on the graphical indicator is one of development goals for those skilled in the art.

SUMMARY

The invention is directed to a graphical indicator, which improves a recognition rate of the graphical indicator in an image recognition process.

An embodiment of the invention provides a graphical indicator including a plurality of blocks, wherein the blocks form an indicator matrix with a dimension of M×N, wherein M and N are respectively positive integers greater than 3, and the blocks include a plurality of header blocks and a plurality of content blocks. The header blocks include N first header blocks and (M−1) second header blocks. Each of the content blocks has a data micro-graphic, and the content blocks are used to record dot pattern codes. The N first header blocks are disposed at a first row of the indicator matrix. The (M−1) second header blocks are respectively disposed at (M−1) rows other than the first row of the indicator matrix. The content blocks are disposed at the (M−1) rows. Each of the N first header blocks has a header micro-graphic. Furthermore, one or a plurality of target second header blocks in the (M−1) second header blocks do not have the header micro-graphic, and each of a plurality of remaining second header blocks other than the one or a plurality of target second header blocks in the (M−1) second header blocks has the header micro-graphic.

An embodiment of the invention provides a graphical indicator including a plurality of blocks, wherein the blocks form an indicator matrix with a dimension of M×N, wherein M and N are respectively positive integers greater than 3, and the blocks include a plurality of header blocks and a plurality of content blocks. The header blocks include M first header blocks and (N−1) second header blocks. Each of the content blocks has a data micro-graphic, and the content blocks are used to record dot pattern codes. The M first header blocks are disposed at a first column of the indicator matrix, wherein the (N−1) second header blocks are respectively disposed at (N−1) rows other than the first column of the indicator matrix, wherein the content blocks are disposed at the (N−1) rows. Each of the M first header blocks has a header micro-graphic. One or a plurality of target second header blocks in the (N−1) second header blocks do not have the header micro-graphic, and each of a plurality of remaining second header blocks other than the one or a plurality of target second header blocks in the (N−1) second header blocks has the header micro-graphic.

Based on the above description, the graphical indicator provided by the invention includes a plurality of header blocks and a plurality of content blocks forming the indicator matrix, and a plurality of header micro-graphics and a plurality of data micro-graphics respectively arranged in the header blocks and the content blocks, where the header blocks are further divided into target header blocks and remaining header blocks different from the target header blocks, so as to strengthen the difference between the header blocks and the content blocks to enhance a recognition ability of the graphical indicator. In this way, through the aforementioned specific configuration, the graphical indicator provided by the invention may have a better recognition rate when the graphical indicator is captured by an electronic device to execute a corresponding image recognition operation, so as to accurately recognize the dot pattern codes recorded by the graphical indicator, and improve the efficiency of the image recognition operation performed by the electronic device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7A is a schematic diagram of a target header block according to an embodiment of the invention.

DESCRIPTION OF THE EMBODIMENTS

Figure 1:
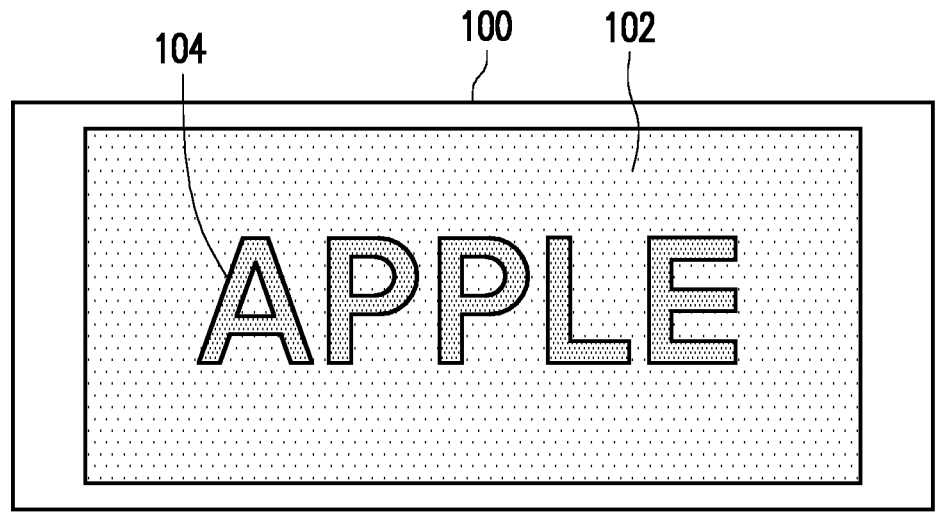
FIG. 1 is a schematic diagram illustrating coexistence of graphical indicators and main information drawn in accordance with the prior art.
Figure 2:
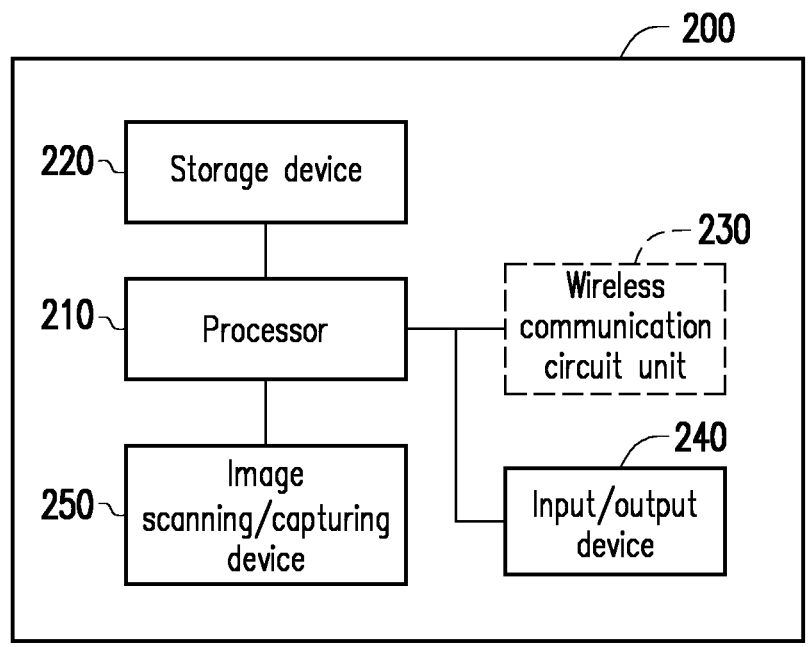
FIG. 2 is a block schematic diagram of an electronic device according to an embodiment of the invention.

To be specific, referring to FIG. 2, in the embodiment, an electronic device 200 includes a processor 210, a storage device 220, an input/output device 240, and an image scanning/capturing device 250.

In another embodiment, the electronic device 200 further includes a wireless communication circuit unit 230. In the other embodiment, the processor 210 may instruct the wireless communication circuit unit 230 to establish a connection with another electronic device, or establish a network connection. The processor 210 may update data stored in the storage device 220 by using the connection or network connection.

In still another embodiment, the electronic device 200 includes the processor 210, the storage device 220, the wireless communication circuit unit 230, and the image scanning/capturing device 250. The processor 210 may instruct the wireless communication circuit unit 230 to establish a wireless connection with an output device to output data (for example, to play multimedia content) through the output device.

In the embodiment, the processor 210 is hardware with a computation function. The processor 210 is used to execute one or a plurality of program codes to manage an overall operation of the electronic device 200. In the embodiment, the processor 210 is, for example, a central processing unit (CPU) with one or a plurality of cores, a programmable microprocessor, a digital signal processor (DSP), a programmable controller, an application specific integrated circuits (ASIC), a programmable logic device (PLD) or other similar devices.

The storage device 220 is used to record some data that needs to be stored for a long time through the instructions of the processor 210. For example, the storage device 220 records firmware or software used to manage the electronic device 200; and a plurality of databases (for example, a dot pattern code database, a multimedia database). The dot pattern code database is used to store data corresponding to a plurality of dot pattern codes. The multimedia database is used to store a plurality of multimedia contents, where the multimedia contents include one of video data, voice messages, static images, and dynamic images, or a combination thereof. It should be noted that in one embodiment, the multiple databases may also be stored in a cloud server on the Internet.

The storage device 220 may be any type of a storage circuit module configured with a non-volatile memory module (for example, a NAND flash memory module). In an embodiment, the storage device 220 is, for example, a storage circuit module with a memory card slot, and may access data stored in a memory card of the memory card slot.

The wireless communication circuit unit 230 is used to transmit or receive data through wireless communication. For example, the wireless communication circuit unit 230 may have a wireless communication circuit module (not shown), which is used to support one of a wireless fidelity (WiFi) system, a fifth-generation wireless communication technology (5G), a Bluetooth communication technology or a combination thereof, but the invention is not limited thereto. It should be noted that, in an embodiment, the communication circuit unit 230 may also establish a network connection to the Internet to upload/download appropriate data or transmit/receive corresponding instructions or update the software/firmware of the electronic device.

The input/output device 240 includes an input device and an output device. The input device is used to receive an input operation to generate an input instruction; the output device is used to output multimedia content. The input device is, for example, various forms of physical buttons, a microphone (used to receive voice instructions), or a touch screen. The output device may include a speaker, a screen (or a touch screen), and/or a transmission interface such as a universal serial bus (USB).

The image scanning/capturing device 250 includes at least one light source (for example, LED) and an image sensing element, where the image sensing element may be, for example, a charge-coupled device (CCD) or a complementary metal oxide semiconductor (CMOS) image sensor. The light source is used to illuminate a surface pointed by the image scanning/capturing device 250. For example, the image scanning/capturing device 250 may be installed on a surface of a casing of the electronic device 200, and the image scanning/capturing device 250 may use the light source to illuminate an object surface 100 pointed by the image scanning/capturing device 250 to show main information and a plurality of graphical indicators printed on the object surface 100, such that the image scanning/capturing device 250 may perform an image capturing operation on the shown main information and graphical indicators to obtain a corresponding image. The object surface is, for example, a physical element such as a wood chip, a paper, a plastic cloth, a metal sheet, etc., that may be printed with the main information including text, images, etc. The image scanning/capturing device may capture an image printed on the object surface.

Then, the processor 210 recognizes digital data (for example, the dot pattern codes) of the graphical indicator 102 from the image. The processor 210 may perform a decoding operation on the digital data to obtain decoded information corresponding to the digital data. Then, the processor 210 may instruct the output device to output multimedia content (for example, a video, an image, or an audio) or a work/operation instruction corresponding to the decoded information in a predetermined form according to the decoded information. The multimedia content may be stored in the storage device in advance. In this way, by printing a plurality of graphical indicators 102 that are not easily recognized by human eyes onto an object surface (such as a book page), a commonly used object surface such as a book page may additionally record dot pattern codes, so that the electronic device 200 may perform an image recognition operation on an image obtained by capturing the object surface such as the book page, so as to obtain the dot pattern codes in the image, and then read the multimedia content corresponding to the decoded information from the storage device 220 according to the decoded information corresponding to the dot pattern codes, and output the multimedia content. The decoded information is used to indicate an identification code/a file name of the multimedia content to be output. The method that the image scanning/capturing device 250 identifies the dot pattern codes in the captured image is not the main technical content of the invention, so that detail thereof is not repeated.

Figure 3:
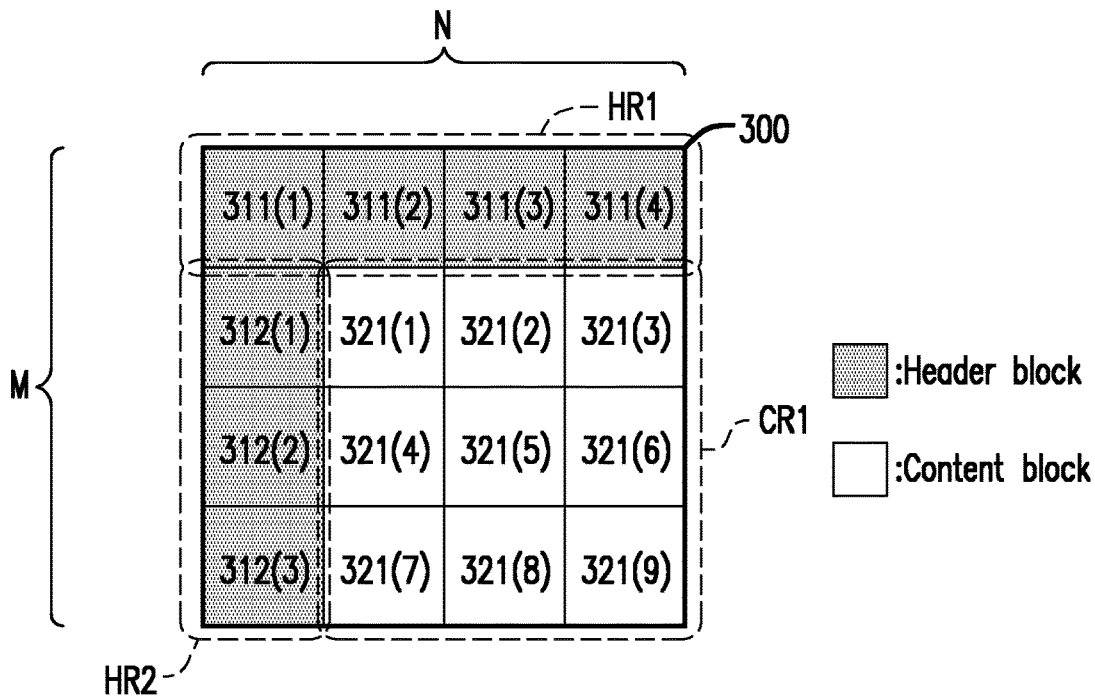
FIG. 3 is a schematic diagram of a graphical indicator according to an embodiment of the invention.

FIG. 3 is a schematic diagram of a graphical indicator according to an embodiment of the invention. Referring to FIG. 3, a graphical indicator 300 includes a plurality of blocks (for example, blocks 311(1)-311(4), 312(1)-312(3), 321(1)-321(9)). Shown as multiple grids in FIG. 3, the blocks of the graphical indicator 300 are virtual, which means that the graphical indicator is not implemented by printing grid lines of these grids. In the embodiment, the arrangement and relative position relationship of the blocks are used to indicate positions of header micro-graphics, data micro-graphics, or/and header data micro-graphics to be configured. In addition, the header micro-graphics, data micro-graphics, and header data micro-graphics are tiny images that are actually printed on the object surface.

The multiple blocks constitute an index matrix with a dimension of M×N, and the multiple blocks include a plurality of header blocks (for example, the blocks 311(1)-311(4) and the block 312(1)-312(3)) and a plurality of content blocks (for example, the blocks 321(1)-321(9)), where M and N are respectively positive integers greater than 3.

The header blocks include N first header blocks 311(1)-311(4) and (M−1) second header blocks 312(1)-312(3). The content blocks 321(1)-321(9) are used to record the dot pattern codes.

For example, as shown in FIG. 3, M is equal to N, and both M and N are equal to 4. The four first header blocks 311(1)-311(4) are disposed at a first row (a first one of rows from top to bottom) of the indicator matrix. 3 (4−1=3) second header blocks 312(1)-312(3) are respectively disposed at 3 (for example, 4−1) rows other than the first row of the indicator matrix, where the content blocks 321(1)-321(9) are disposed at the (M−1) rows. The 3 (for example, 4−1) rows other than the first row of the indicator matrix may also be referred to as an array region. In addition, a total number of the header micro-graphic of the graphical indicator is less than (M+N−1), and a total number of the content blocks is equal to [M*N−(M+N−1)].

In detail, in the example of FIG. 3, the second header blocks are respectively disposed at a first column of each row of the array region. The other columns that are not configured with the header blocks in each row of the array region are configured with the content blocks 321(1)-321(9). The content blocks 321(1)-321(9) may constitute a content region CR1.

The first header blocks may constitute a first header region HR1 in a linear form, and the second header blocks may constitute a second header region HR2 in the linear form. It should be noted that as shown in FIG. 3, a first connection end (for example, the first header block 311(1)) of the first header region HR1 is adjacent to a second connection end (for example, the second header block 312(1)) of the second header region HR2, the first header region HR1 is perpendicular to the second header region HR2, and all of the second header blocks of the second header region HR2 (for example, 312(1)-312(3)) belong to the column (for example, the first column) corresponding to the first connection end of the first header region HR1 in a plurality of columns of the indicator matrix. In the embodiment, the other parts of the graphical indicator 300 other than the first header region HR1 and the second header region HR2 may be defined as the content region CR1.

In the above embodiment, the second header blocks may constitute the second header region HR2 connected/adjacent to the first header region HR1 according to a linear form, and the first header region HR1 is perpendicular to the second header region HR2, but the invention is not limited thereto. For example, in another embodiment, the second header blocks may constitute the second header region HR2 in a form other than the linear form, or/and the second header region HR2 may not be perpendicular to the first header region HR1.

Figure 4A:
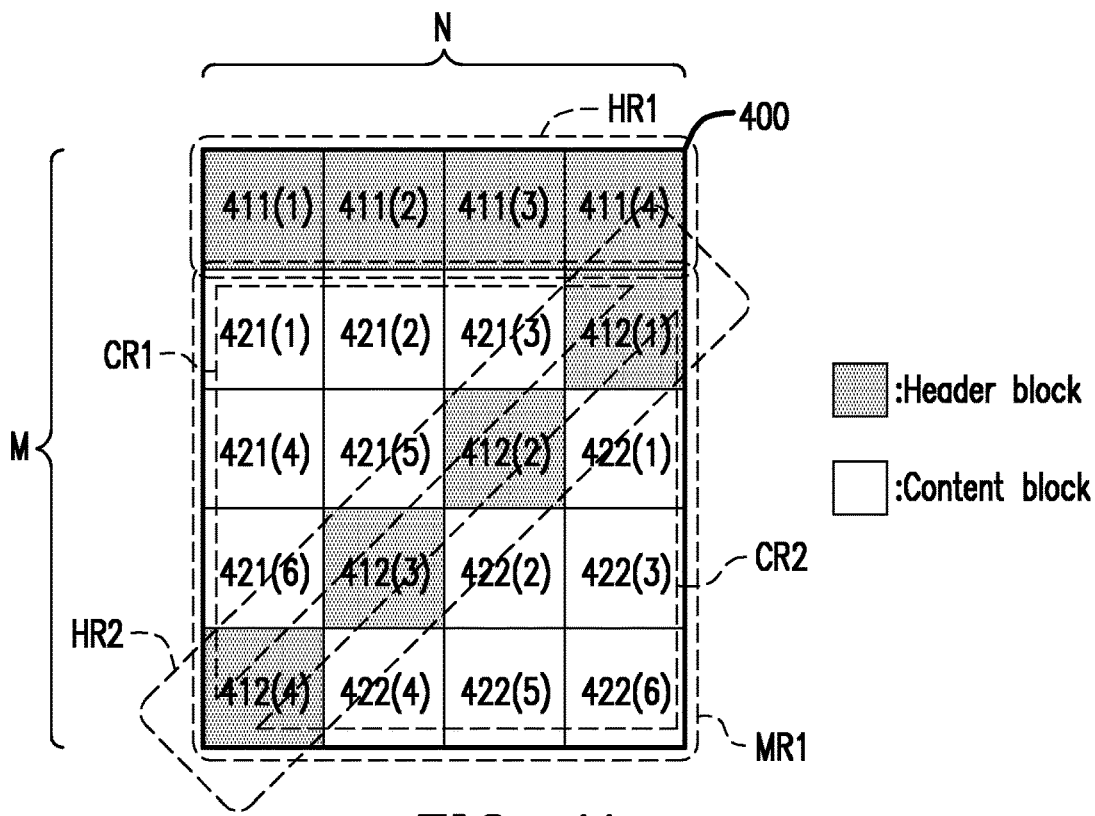
FIG. 4A is a schematic diagram of a graphical indicator according to an embodiment of the invention.

FIG. 4A is a schematic diagram of a graphical indicator according to an embodiment of the invention. Referring to FIG. 4A, a graphical indicator 400 is an indicator array of 5×4. The header blocks include first header blocks 411(1)-411(4), and second header blocks 412(1)-412(4).

In the embodiment, the first header blocks 411(1)-411(4) may constitute the first header region HR1 in the linear form, and the second header blocks 412(1)-412(4) may constitute the second header region HR2 in the linear form. In the embodiment, other parts of the graphical indicator 400 other than the first header region HR1 and the second header region HR2 may be set as content regions CR1 and CR2, where the content region CR1 includes content blocks 421(1)-421(6), and the content region CR2 includes content blocks 422(1)-422(6). A second connection end (for example, the second header block 412(1)) of the second header region HR2 is adjacent to a first connection end (for example, the first header block 411(4)) of the first header region HR1. The portion of the graphical indicator 400 that is not the first header region HR1 may be referred to as an array region MR1. It should be noted that in the embodiment, not all of the second header blocks (for example, 412(1)-412(4)) of the second header region HR2 belong to the column (for example, a $4^{th}$ column) corresponding to the first connection end of the first header region HR1 in a plurality of columns in the indicator matrix. For example, in the second header blocks 412(1)-412(4) of the second header region HR2, only one second header block 412(1) belongs to the column corresponding to the first connection end 411(4), and the other second header blocks 412(2), 412(3), and 412(4) respectively belong to a plurality of columns (for example, the $3^{rd}$ column, the $2^{nd}$ column, and $1^{st}$ column) corresponding to the other first header blocks 411(3), 411(2), 411(1). In addition, an overall arrangement pattern of the first header region HR1 and the second header region HR2 is like the number 7, and the second header region HR2 is arranged on a diagonal of the array region MR1.

It should be noted that the other second header blocks 412(2)-412(4) arranged after the second connection end 412(1) in the second header region HR2 and the corresponding first header blocks 411(3), 411(2), and 411(1) respectively have one or more content blocks there between, and a total number of the one or more content blocks between the first header block and the second header block belonging to the same column is increased along with an order of the second header block arranged after the second connection end. For example, the second header block 412(2) is the "1$^{st}$" second header block arranged after the second connection end 412(1), and a total number of the content block between the second header block 412(2) and the corresponding first header block 411(3) is "1"; the second header block 412(3) is the "2$^{nd}$" second header block arranged after the second connection end 412(1), and a total number of the content blocks between the second header block 412(3) and the corresponding first header block 411(2) is "2"; the second header block 412(4) is the "3$^{rd}$" second header block arranged after the second connection end 412(1), and a total number of the content blocks between the second header block 412(4) and the corresponding first header block 411(1) is "3".

Figure 4B:
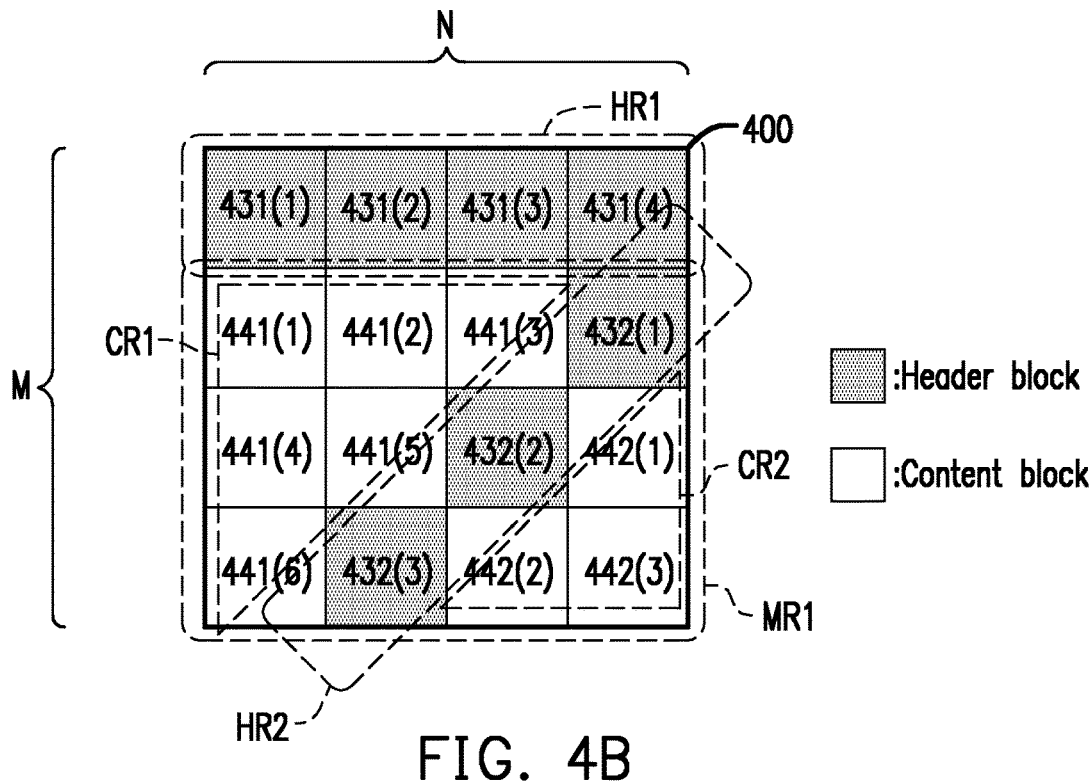
FIG. 4B is a schematic diagram of a graphical indicator according to an embodiment of the invention.

FIG. 4B is a schematic diagram of a graphical indicator according to an embodiment of the invention. Referring to FIG. 4B, a graphical indicator 410 is an indicator array of 4×4. The header blocks include first header blocks 431(1)-431(4), and second header blocks 432(1)-432(3).

In the embodiment, the first header blocks 431(1)-431(4) may constitute the first header region HR1 in the linear form, and the second header blocks 432(1)-432(3) may constitute the second header region HR2 in the linear form. In the embodiment, other parts of the graphical indicator 410 other than the first header region HR1 and the second header region HR2 may be set as the content regions CR1 and CR2, where the content region CR1 includes content blocks 441(1)-441(6), and the content region CR2 includes content blocks 442(1)-442(3). A second connection end 432(1) of the second header region HR2 is adjacent to a first connection end 431(4) of the first header region HR1. The portion of the graphical indicator 410 that is not the first header region HR1 may be referred to as the array region MR1. It should be noted that an overall arrangement pattern of the first header region HR1 and the second header region HR2 is like the number 7, and not all of the second header blocks (for example, 432(1)-432(3)) of the second header region HR2 belong to the column (for example, a 4$^{th}$ column) corresponding to the first connection end of the first header region HR1 in a plurality of columns in the array region, and in the second header blocks 432(1)-432(3) of the second header region HR2, only one second header block 432(1) belongs to the column corresponding to the first connection end 431 (4), and the other second header blocks 432(2), 432(3) respectively belong to a plurality of columns (for example, the 3$^{rd}$ column, the 2$^{nd}$ column) corresponding to the other first header blocks 431(3), 431(2).

Similar to the example of FIG. 4A, the other second header blocks 432(2), 432(3) arranged after the second connection end 432(1) in the second header region HR2 and the corresponding first header blocks 431(3), 431(2) respectively have one or more content blocks there between, and a total number of the one or more content blocks between the first header block and the second header block belonging to the same column is increased along with an order of the second header block arranged after the second connection end. For example, the second header block 432(2) is the "1$^{st}$" second header block arranged after the second connection end 432(1), and a total number of the content block between the second header block 432(2) and the corresponding first header block 431(3) is "1"; the second header block 432(3) is the "2$^{nd}$", second header block arranged after the second connection end 432(1), and a total number of the content blocks between the second header block 432(3) and the corresponding first header block 431(2) is "2". In addition, in the aforementioned embodiments, each row of the indicator array of the graphical indicator has at least one header block. It should be noted that the arrangement of the first header blocks and the arrangement of the second header blocks in FIG. 3, FIG. 4A, and FIG. 4B approximately form an included angle.

Figure 5A:
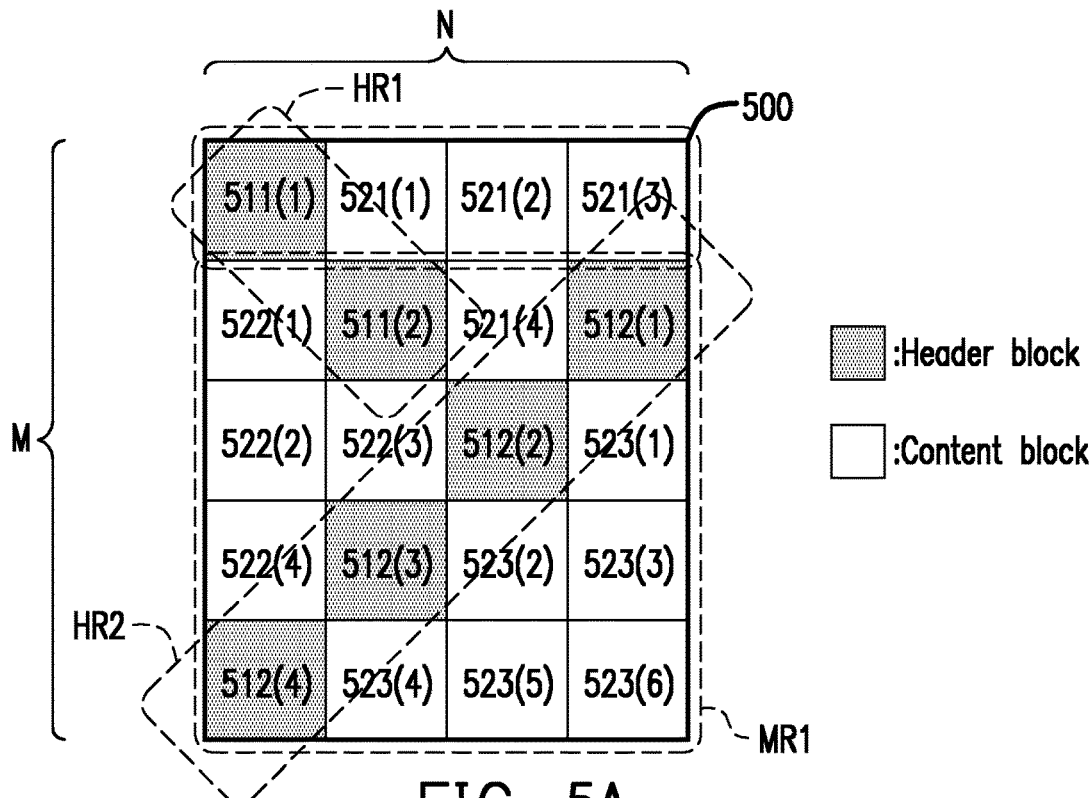
FIG. 5A and FIG. 5B are schematic diagrams of graphical indicators according to an embodiment of the invention.
Figure 5B:
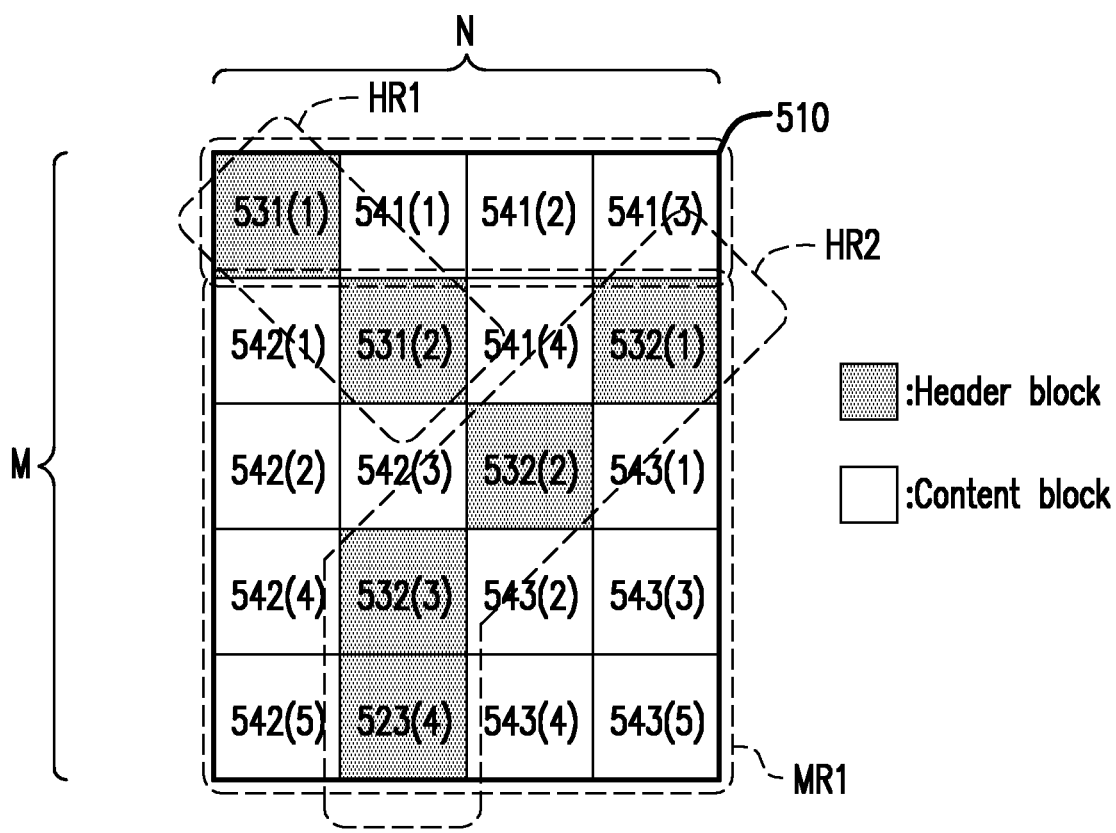

FIG. 5A is a schematic diagram of a graphical indicator according to an embodiment of the invention. FIG. 5B is a schematic diagram of a graphical indicator according to an embodiment of the invention. Referring to FIG. 5A, in the embodiment, a graphical indicator 500 is an indicator array of 5×4. The header blocks of the graphical indicator 500 include a plurality of first header blocks 511(1)-511(2), and a plurality of second header blocks 512(1)-512(4), where the first header blocks 511(1)-511(2) may constitute the first header region HR1 in the linear form, and the second header blocks 512(1)-512(4) may constitute the second header region HR2 in the linear form. In addition, an overall arrangement pattern of the first header region HR1 and the second header region HR2 is like the letter "y", and the second header region HR2 is arranged on a diagonal of the array region MR1, where the first header block 511(2) (which is also referred to as the first connection end) of the first header region HR1 is connected/adjacent to the second header block 512(2) (which is also referred to as the second connection end) of the second header region HR2.

It should be noted that in the above embodiment, the first or second header region is in the linear form, but the invention is not limited thereto. For example, referring to FIG. 5B, in an indicator matrix of a graphical indicator 510, the header blocks of the graphical indicator 510 include a plurality of first header blocks 531(1)-531(2), and a plurality of second header blocks 532(1)-532(4), where the first header blocks 531(1)-531(2) constitute the first header region HR1 in the linear form, and the second header blocks 532(1)-532(4) constitute the second header region HR2 in a form other than the linear form.

In the embodiment, the header regions HR1, HR2 in each graphical indicator may help distinguishing a plurality of adjacent graphical indicators. After distinguishing each graphical indicator, the content region of each graphical indicator may record a plurality of binary values corresponding to the dot pattern codes through multiple configured data micro-graphics. In detail, taking FIG. 4 as an example, header information contained in the header regions HR1 and HR2 (the header information may be obtained through header micro-graphics or/and header data micro-graphics configured in the header region HR1 and HR2) is important reference information for the processor 210 to orientate the graphical indicator 400.

Particularly, in the example of FIG. 5A and FIG. 5B, the multiple content blocks corresponding to the indicator matrix of the graphical indicator 500 may be regarded as being divided into three content regions by the first header region HR1 and the second header region HR2, for example, the content region at the top of the graphical indicator 500 includes a plurality of content blocks 521(1)-521(4); the content region to the left of the graphical indicator 500 includes a plurality of content blocks 522(1)-522(4); the content region to the bottom right of the graphical indicator 500 includes a plurality of content blocks 523(1)-523(6). It should be noted that, compared to 8 of the 20 blocks of the 5×4 indicator matrix in FIG. 4A being set as the header blocks, in the 20 blocks of the 5×4 indicator matrix in FIG. 5A, only 6 blocks are set as the header blocks, so that a total number of the content blocks is increased. In addition, since the multiple content blocks in FIG. 5A are also more evenly distributed in the graphical indicator 500, a distance between each content block and the closest header block is not increased due to the design of the header regions in FIG. 5A and FIG. 5B, but a total number of the dot pattern codes of the graphical indicators 500 and 510 is increased while a recognition degree in the graphical indicator 500 and recognition efficiency of the content blocks are maintained, thereby increasing a total amount of content respectively carried by the graphical indicators 500 and 510.

In addition, it should be noted that in order to enhance the header information carried by the header regions HR1 and HR2, in the embodiment, a plurality of second header blocks in the second header region in the graphical indicator include one or a plurality of target second header blocks (which are also referred to as target header blocks) and remaining second header blocks (which are also referred to as remaining header blocks) that are different from the one or a plurality of target second header blocks. In this way, a difference between the target header blocks and the remaining header blocks in the second header region may be further added to the header information to enhance the details of the header information.

To be more specific, in the embodiment, each of the first header blocks in the first header region has a header micro-graphic. In addition, one or a plurality of target second header blocks in the second header region do not have the header micro-graphic, and each of the plurality of remaining header blocks has the header micro-graphic.

Figure 6A:
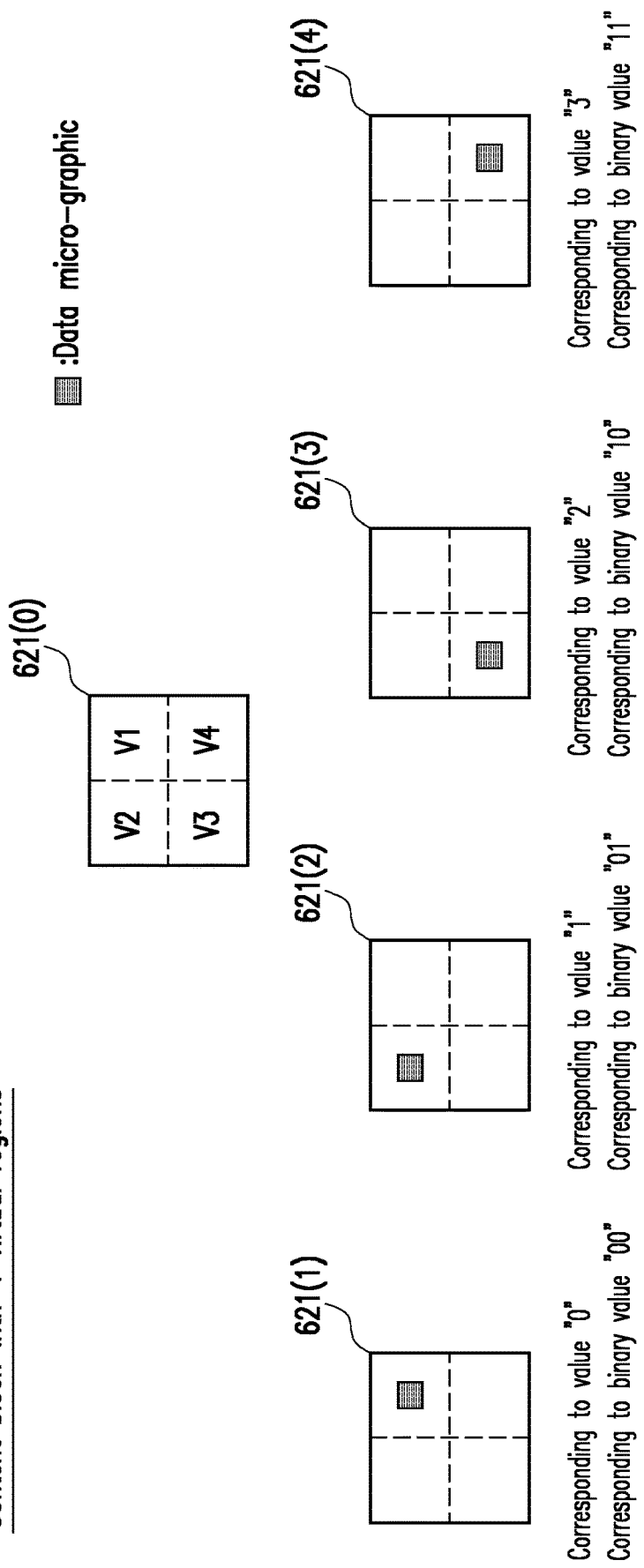
FIG. 6A is a schematic diagram of a content block according to an embodiment of the invention.

FIG. 6A is a schematic diagram of a content block according to an embodiment of the invention. In the embodiment, the data micro-graphic arranged in the content block may be arranged in one of a plurality of virtual regions at different positions in the content block, so that the data micro-graphics with different positions may be used to indicate corresponding different values.

To be more specific, each content block of the plurality of content blocks has V virtual regions, where V is a positive integer greater than or equal to 3. In addition, the data micro-graphic of each content block of the plurality of content blocks is selectively set in one of the V virtual regions of the content block to which the data micro-graphic belongs, so that each content block of the plurality of content blocks may correspond to a binary value.

Referring to FIG. 6A, it is assumed that the content block 621(0) has 4 virtual regions V1-V4 (V=4). In this example, the data micro-graphic may be arranged in the virtual region V1, so that the content block 621(1) may correspond to a value "0" (i.e., corresponding to a binary value "00"); the data micro-graphic may be arranged in the virtual region V2, so that the content block 621(2) may correspond to a value "1" (i.e., corresponding to a binary value "01"); the data micro-graphic may be arranged in the virtual region V3, so that the content block 621(3) may correspond to a value "2" (i.e., corresponding to a binary value "10"); the data micro-graphic may be arranged in the virtual region V4, so that the content block 621 (4) may correspond to a value "3" (i.e., corresponding to a binary value "11"). The processor 210 may identify the value corresponding to the content block according to the position of the data micro-graphic in the content block.

In the above example, the data micro-graphic is arranged at a center of the designated virtual region, but the invention is not limited thereto. For example, the data micro-graphic may also be arranged at different positions of the designated virtual region. The processor 210 may further recognize different positions of the data micro-graphic in the virtual region to which the data micro-graphic belongs. In this way, the data micro-graphic arranged in the same virtual region may correspond to different values according to different positions, which is described with reference of FIG. 6B.

Figure 6B:
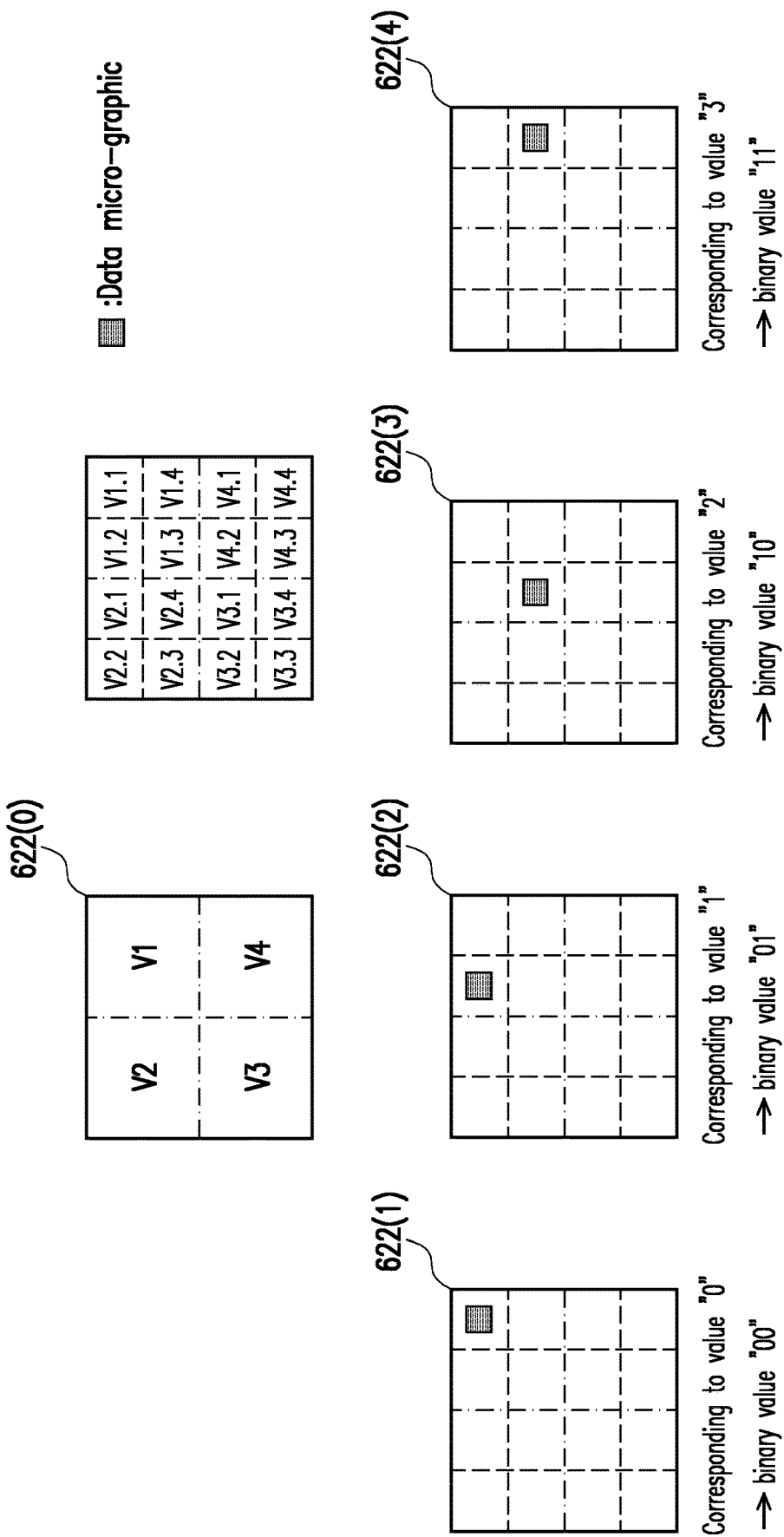
FIG. 6B is a schematic diagram of a content block according to an embodiment of the invention.

FIG. 6B is a schematic diagram of a content block according to an embodiment of the invention. Referring to FIG. 6B, it is assumed that the content block 622(0) has 4 virtual regions V1-V4 (V=4). Each virtual region may be divided into a plurality of virtual sub-regions. For example, the virtual region V1 includes virtual sub-regions V1.1-V1.4, the virtual region V2 includes virtual sub-regions V2.1-V2.4, the virtual region V3 includes virtual sub-regions V3.1-V3.4 and the virtual region V4 includes virtual sub-regions V4.1-V4.4. It should be noted that the invention is not limited to the number of the virtual sub-regions included in each virtual region. The data micro-graphic may be set in a plurality of virtual sub-regions of one of the plurality of virtual regions. In the following description, the data micro-graphic is, for example, arranged in the virtual region V1 (for example, the content blocks 622(1)-622(4) shown in FIG. 6B).

In the example of FIG. 6B, the data micro-graphic may be arranged in the virtual sub-region V1.1 at the upper right of the virtual region V1, so that the virtual sub-region V1.1 of the content block 622(1) may correspond to the value "0" (i.e., corresponding to the binary value "00"); the data micro-graphic may be arranged in the virtual sub-region V1.2 at the upper left of the virtual region V1, so that the virtual sub-region V1.2 of the content block 622(2) may correspond to the value "1" (i.e., corresponding to the binary value "01"); the data micro-graphic may be arranged in the virtual sub-region V1.3 at the bottom left of the virtual region V1, so that the virtual sub-region V1.3 of the content block 622(3) may correspond to the value "2" (i.e., corresponding to the binary value "10"); the data micro-graphic may be arranged in the virtual sub-region V1.4 at the bottom right of the virtual region V1, so that the virtual sub-region V1.4 of the content block 622(4) may correspond to the value "3" (i.e., corresponding to the binary value "11").

In the embodiment of FIG. 6A and FIG. 6B, each content block has only one data micro-graphic, but the invention is not limited thereto. For example, in another embodiment, each content block may have one or more data micro-graphic, and the binary value represented by each content block is a set of all of the data micro-graphics in the content block, which is described below with reference of FIG. 6C.

Figure 6C:
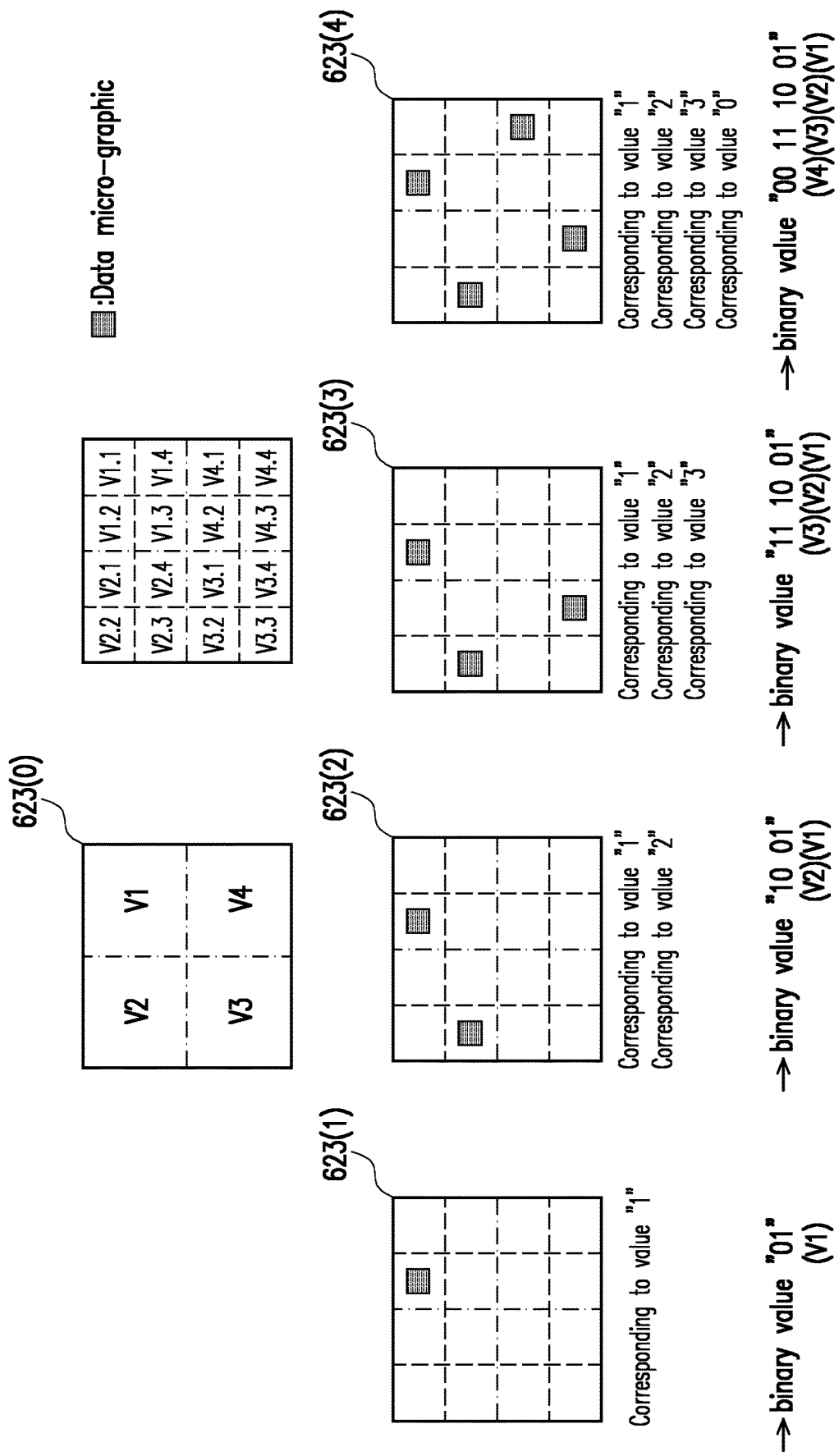
FIG. 6C is a schematic diagram of a content block according to an embodiment of the invention.

FIG. 6C is a schematic diagram of a content block according to an embodiment of the invention. Referring to FIG. 6C, it is assumed that the content block 623(0) has 4 virtual regions V1-V4 (V=4). Each virtual region may be divided into a plurality of virtual sub-regions. For example, the virtual region V1 includes virtual sub-regions V1.1-V1.4, the virtual region V2 includes virtual sub-regions V2.1-V2.4, the virtual region V3 includes virtual sub-regions V3.1-V3.4, and the virtual region V4 includes virtual sub-regions V4.1-V4.4. The data micro-graphic may be set in a plurality of the virtual sub-regions of one or more virtual regions.

In the example of FIG. 6C, a data micro-graphic of the content block 623(1) may be arranged in the virtual sub-region V1.2 at the upper left of the virtual region V1, so that the virtual sub-region V1.2 of the content block 623(1) may correspond to the value "1", and the content block 623(1) corresponds to a binary value "00 00 00 01" (corresponding to the values "0 0 0 1" respectively represented by the virtual regions V4-V1); a data micro-graphic of the content block 623(2) may be arranged in the virtual sub-region V1.2 at the upper left of the virtual region V1, and another data micro-graphic of the content block 623(2) may be arranged in the virtual sub-region V2.3 at the bottom left of the virtual region V2, so that the virtual sub-region V1.2 of the content block 623(2) may correspond to the value "1", and the virtual sub-region V2.3 of the content block 623(2) may correspond to the value "2", such that the content block 623(2) corresponds to a binary value "00 00 10 01"; a data micro-graphic of the content block 623(3) is arranged in the virtual sub-region V1.2 at the upper left of the virtual region V1, another data micro-graphic of the content block 623(3) may be arranged in the virtual sub-region V2.3 at the bottom left of the virtual region V2, and another data micro-graphic of the content block 623(3) is arranged in the virtual sub-region V3.4 at the bottom right of the virtual region V3, so that the virtual sub-regions V1.2, V2.3, V3.4 of the content block 623(3) respectively correspond to the values "1", "2", "3", such that the content block 623(3) corresponds to a binary value "00 11" 10 01"; a data micro-graphic of the content block 623(4) is arranged in the virtual sub-region V1.2 at the upper left of the virtual region V1, another data micro-graphic of the content block 623(4) may be arranged in the virtual sub-region V2.3 at the bottom left of the virtual region V2, another data micro-graphic of the content block 623(4) is arranged in the virtual sub-region V3.4 at the bottom right of the virtual region V3, and still another data micro-graphic of the content block 623(4) is arranged in the virtual sub-region V4.1 at the upper right of the virtual region V4, so that the virtual sub-regions V1.2, V2.3, V3.4 and V4.1 of the content block 623(4) respectively correspond to the values "1", "2", "3", and "0", such that the content block 623(4) corresponds to the binary value "00 11" 10 01".

In the embodiment, the one or more target header blocks respectively belong to one of the following types: (1) a first type, where the target second header block belonging to the first type is empty; and (2) a second type, where the target header block belonging to the second type has W virtual regions, where W is a positive integer greater than or equal to 2, where one or more of the W virtual regions are respectively configured with one header data micro-graphic so that the target second header block belonging to the second type may correspond to a header data value. In addition, the header data value includes one or more of the following information: auxiliary header information; and auxiliary data information (for example, one of a plurality of bit values).

In brief, the largest difference between the target header block belonging to the first type (which is also referred to as a first type target header block) and the first header block and the remaining header block is that the first type target header block is not configured with any micro-graphic (regardless of the data micro-graphic, the header micro-graphic or the header data micro-graphic). In the embodiment, the first type target header block is empty.

On the other hand, the target header block belonging to the second type (which is also referred to as a second type target header block) is not empty. In the embodiment, the second type target header block may have one or more header data micro-graphics, which is described below with reference of FIG. 7A and FIG. 7B.

FIG. 7A is a schematic diagram of a target header block according to an embodiment of the invention. Referring to FIG. 7A, it is assumed that the second type target header block has two virtual regions (W=2), and the two virtual regions may equally divide an area of the second type target header block, for example, the virtual regions V1, V2 arranged on top and bottom of a second type target header block 721(0); the virtual regions V1, V2 arranged on the left and right of a second type target header block 722(0); the virtual regions V1, V2 arranged along a diagonal of a second type target header block 723(0); and the virtual regions V1, V2 arranged along another diagonal of a second type target header block 724(0).

Figure 7B:
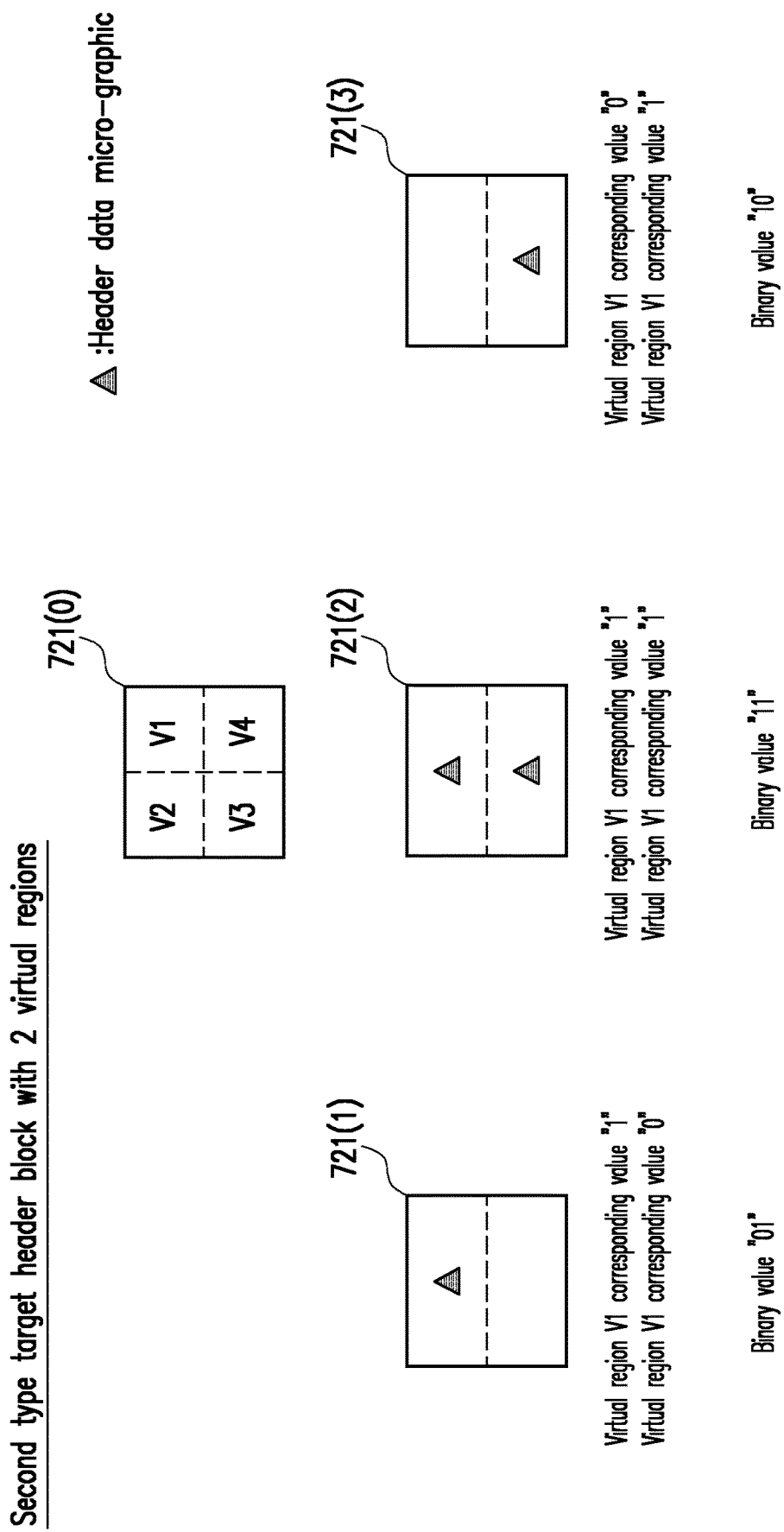
FIG. 7B a schematic diagram of a target header block according to an embodiment of the invention.

FIG. 7B a schematic diagram of a target header block according to an embodiment of the invention. Referring to FIG. 7B, it is assumed that the second type target header block 721(0) has the virtual regions V1, V2 arranged on top and bottom. One header data micro-graphic of the second type target header block 721(1) may be configured in the virtual region V1, so that the virtual region V1 corresponds to the value "1", and the other virtual region V2 without the header data micro-graphic corresponds to the value "0", and the second type target header block 721(1) corresponds to a binary value "01". For another example, one header data micro-graphic of the second type target header block 721(2) may be configured in the virtual region V1, so that the virtual region V1 corresponds to the value "1", and another header data micro-graphic may be configured in the virtual region V2, so that the virtual region V2 corresponds to the value "1". In this way, the second type target header block 721(2) may correspond to a binary value "11". For another example, one header data micro-graphic of the second type target header block 721(3) may be configured in the virtual region V2, so that the virtual region V2 corresponds to the value "1", and the other virtual region V1 without the header data micro-graphic corresponds to the value "0", and the second type target header block 721(3) corresponds to a binary value "10".

In the embodiment, two end second header blocks located at both ends of the second header region in the plurality of second header blocks of the second header region include: one of the plurality of remaining header blocks and one of the one or more target header blocks, where the one of the one or more target header blocks is adjacent to the first header region; or two of the plurality of remaining header blocks.

In brief, there are two patterns to set the target header block in the second header region. A first pattern is that the target header block in the second header region may be located at one of the two ends of the second header region adjacent to the first header region. The second pattern is that the target header block in the second header region cannot be located at the two ends of the second header region.

Figure 8A:
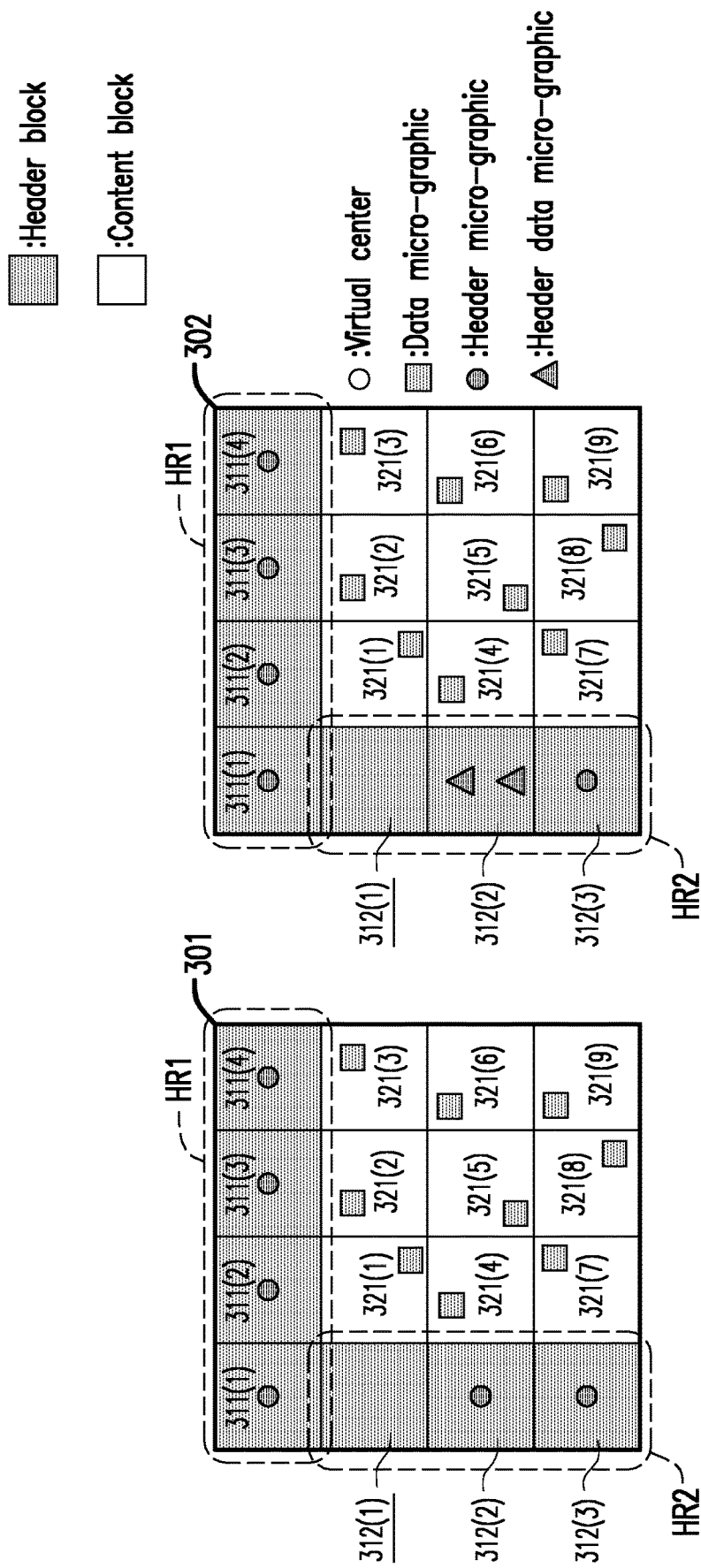
FIG. 8A is a schematic diagram of a graphical indicator according to an embodiment of the invention.

FIG. 8A is a schematic diagram of a graphical indicator according to an embodiment of the invention. Referring to FIG. 8A, in the second header region HR2 of a graphical indicator 301, the header block adjacent to one end of the first header region HR1 is the target header block 312(1) without the header micro-graphic. The remaining header block 312(3) with the header micro-graphic is located at the other end of the second header region HR2 (not adjacent to the other end of the first header region HR1). In addition, the target header block 312(1) of the graphical indicator 301 is empty.

For another example, a difference between a graphical indicator 302 and the graphical indicator 301 is that the target header block 312(2) that is not arranged at the two ends of the second header region HR2 has two header data micro-graphics. In an embodiment, positions of the configured target header block 312(2) and the remaining header block 312(3) may be exchanged.

Figure 8B:
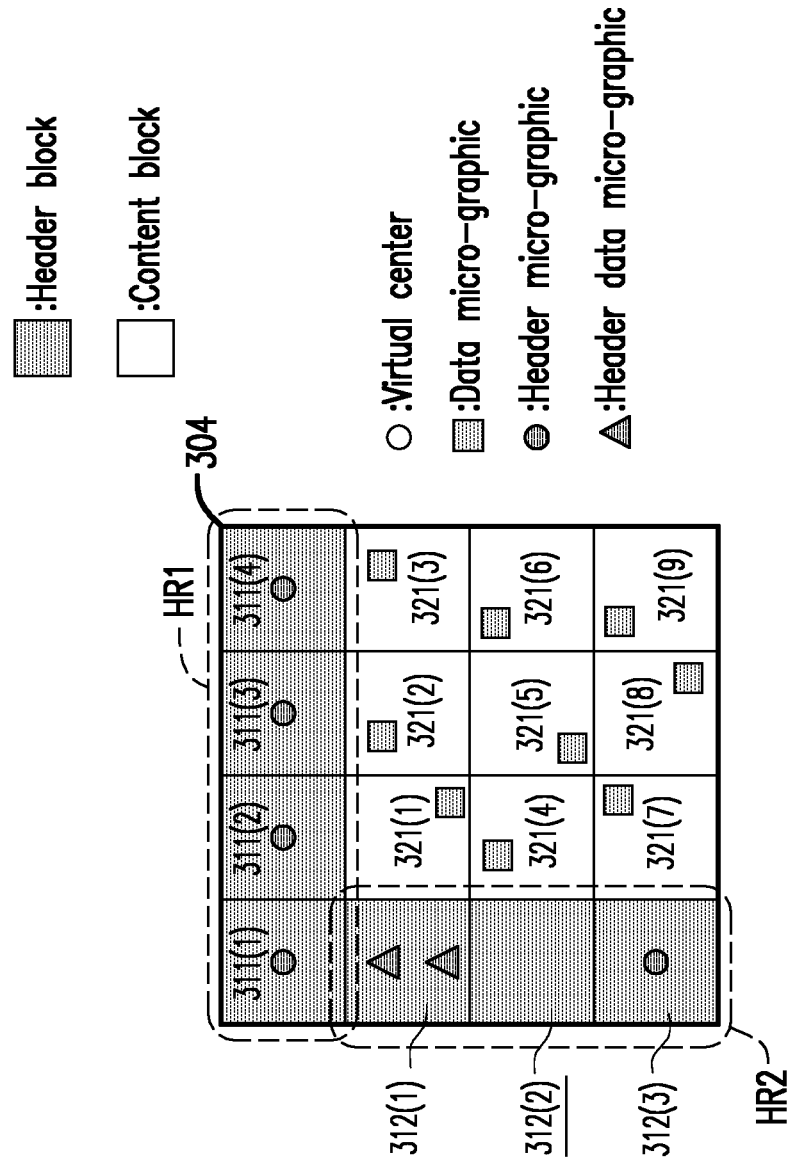
FIG. 8B is a schematic diagram of a graphical indicator according to an embodiment of the invention.

FIG. 8B is a schematic diagram of a graphical indicator according to an embodiment of the invention. Referring to FIG. 8B, the header block at one end of the second header region HR2 of a graphical indicator 304 is the target header block 312(1) without the header micro-graphic, and the header block at the other end of the second header region HR2 is the remaining header block 312(3) with the header micro-graphic. In addition, the header block in the middle of the second header region HR2 is the empty target header block 312(2). The target header block 312(1) of the graphical indicator 304 has two header data micro-graphics, and the two header data micro-graphics of the target header block 312(1) may be set, for example, to color only one of the two header data micro-graphics. It should be noted that in the other embodiments, the position of the target header block with two header data micro-graphics in the second header region HR2 may also be exchanged with the position of the remaining header block 312(3) in the second header region HR2, i.e., one of the header blocks 312(2), 312(3) may be selected to be configured as the target header block with two header data micro-graphics, and the other one may be selected to be configured as the remaining header block with the header micro-graphic.

Figure 9A:
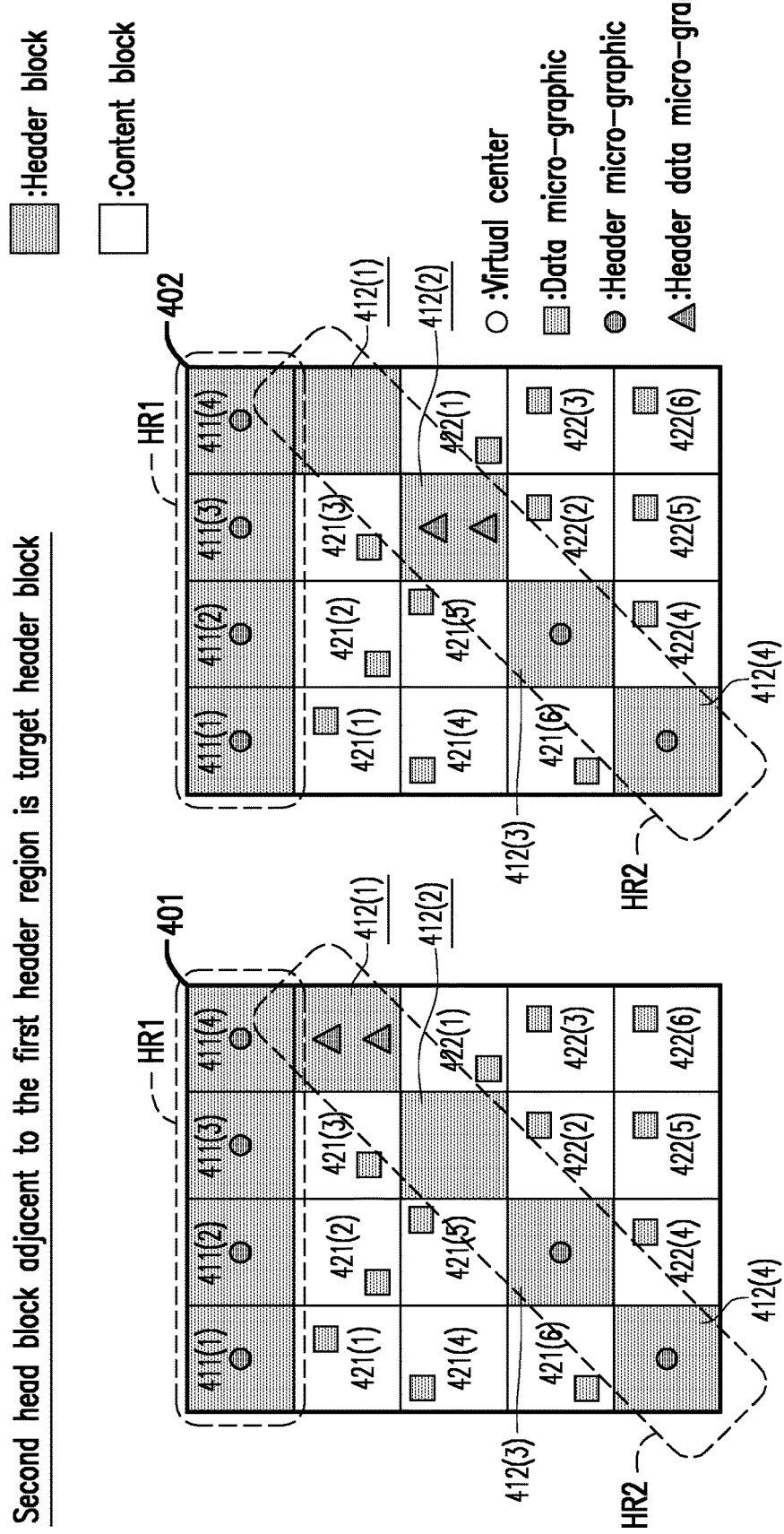
FIG. 9A is a schematic diagram of a graphical indicator according to an embodiment of the invention.

FIG. 9A is a schematic diagram of a graphical indicator according to an embodiment of the invention. Referring to FIG. 9A, in the second header region HR2 of a graphical indicator 401, the header block adjacent to one end of the first header region HR1 is the target header block 412(1) without the header micro-graphic. The remaining header block 412(4) with the header micro-graphic is located at the other end of the second header region HR2 (not adjacent to the other end of the first header region HR1). In addition, the target header block 412(1) of the graphical indicator 401 has two header data micro-graphics, and the target header block 412(2) of the graphical indicator 401 is empty. It should be noted that in other embodiments, the position of the target header block in the second header region HR2 may also be exchanged with the position of one of the remaining header blocks 412(3), 412(4) in the second header region HR2, i.e., one of the header blocks 412(1), 412(3), 412(4) may be selected to be configured as a target header block with two header data micro-graphics.

For another example, in the second header region HR2 of a graphical indicator 402, the header block adjacent to one end of the first header region HR1 is a target header block 412(1) without the header micro-graphic. The remaining header block 412(4) with the header micro-graphic is located at the other end of the second header region HR2 (not adjacent to the other end of the first header region HR1). In addition, the target header block 412(2) of the graphical indicator 402 has two header data micro-graphics, and the target header block 412(1) of the graphical indicator 402 is empty. It should be noted that in other embodiments, the position of the target header block in the second header region HR2 may also be exchanged with the position of one of the remaining header blocks 412(3), 412(4) in the second header region HR2, i.e., one of the header blocks 412(2), 412(3), 412(4) may be selected to be configured as a target header block with two header data micro-graphics.

Figure 9B:
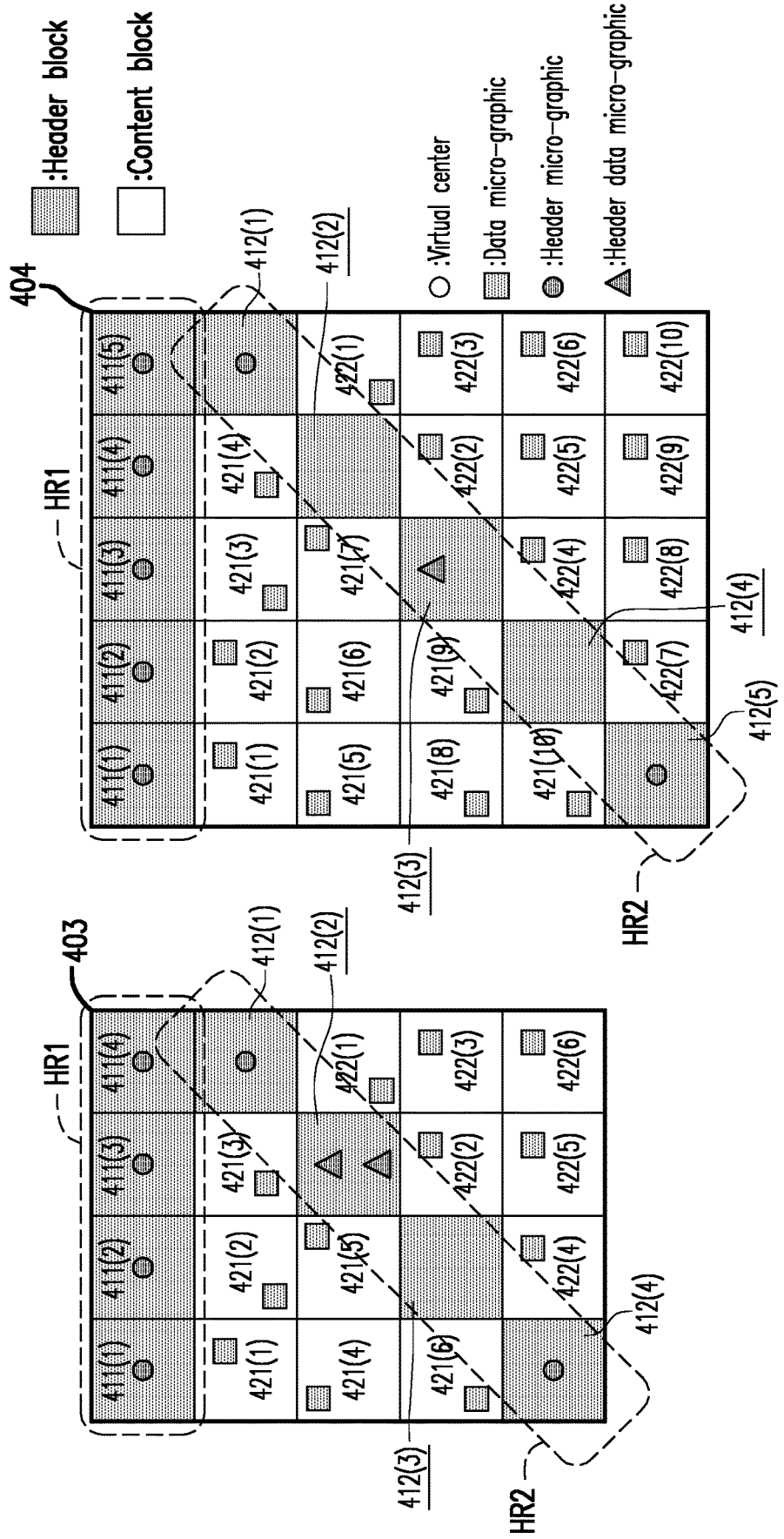
FIG. 9B is a schematic diagram of a graphical indicator according to an embodiment of the invention.

FIG. 9B is a schematic diagram of a graphical indicator according to an embodiment of the invention. Referring to FIG. 9B, the header blocks at two ends of the second header region HR2 of a graphical indicator 403 are the remaining header blocks 412(1) and 412(4) with the header micro-graphics. The target header blocks 412(2), 412(3) without the header micro-graphic are not located at the two ends of the second header region HR2. In addition, the target header block 412(3) of the graphical indicator 403 is empty, and the target header block 412(2) of the graphical indicator 403 has two header data micro-graphics.

On the other hand, the header blocks at both ends of the second header region HR2 of a graphical indicator 404 are the remaining header blocks 412(1), 412(5) with the header micro-graphics. The target header blocks 412(2), 412(3), 412(4) without the header micro-graphic are not located at the two ends of the second header region HR2. In addition, the target header blocks 412(2) and 412(4) of the graphical indicator 404 are empty, and the target header block 412(3) of the graphical indicator 404 has one header data micro-graphic.

Figure 10A:
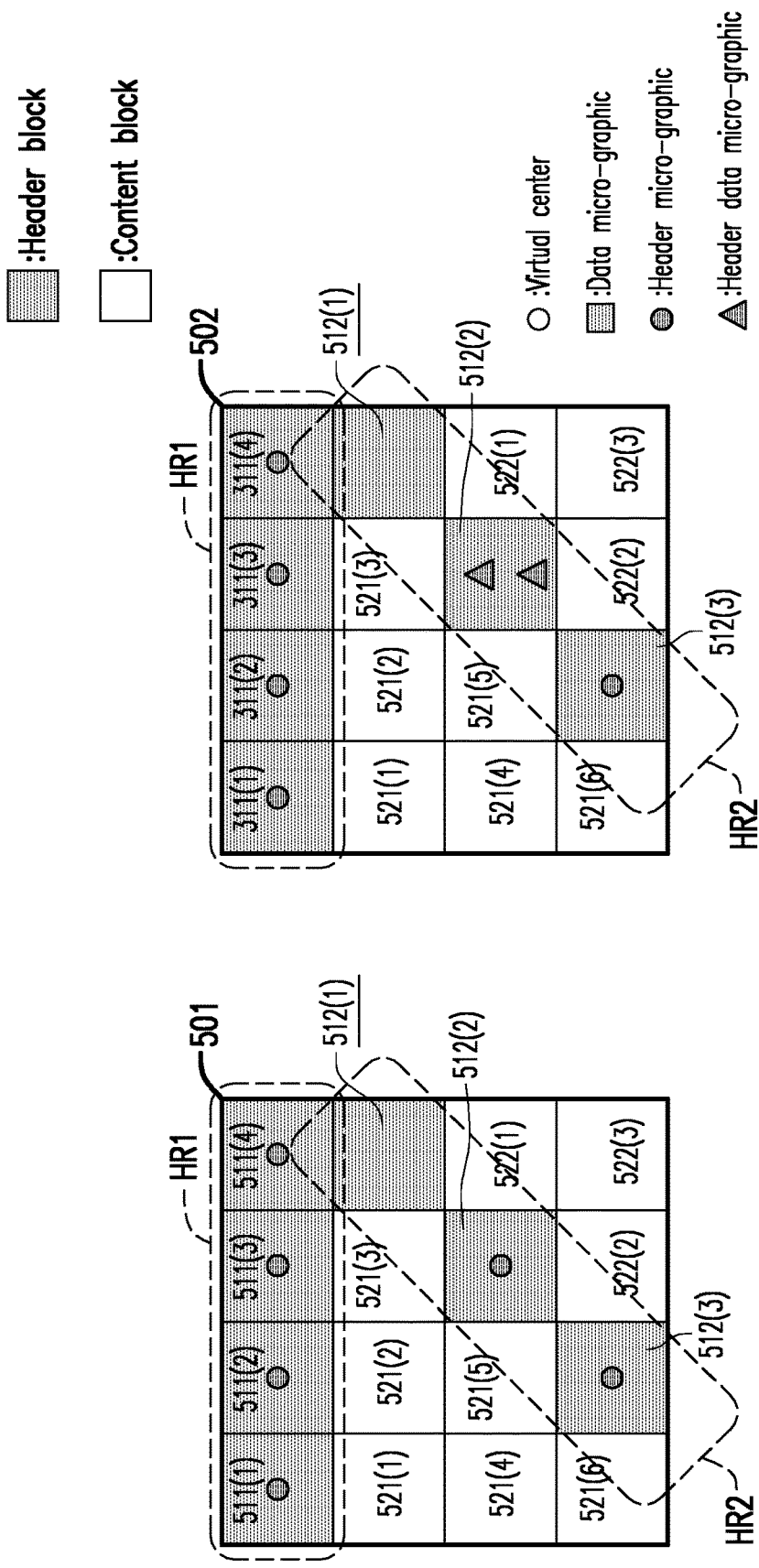
FIG. 10A is a schematic diagram of a graphical indicator according to an embodiment of the invention.

FIG. 10A is a schematic diagram of a graphical indicator according to an embodiment of the invention. Referring to FIG. 10A, in the second header region HR2 of a graphical indicator 501, the header block adjacent to one end of the first header region HR1 is the target header block 512(1) without the header micro-graphic. The remaining header block 512(3) with the header micro-graphic is located at the other end of the second header region HR2 (not adjacent to the other end of the first header region HR1). In addition, the target header block 512(1) of the graphical indicator 501 is empty.

For another example, in the second header region HR2 of a graphical indicator 502, the header block adjacent to one end of the first header region HR1 is an empty target header block 512(1). The remaining header block 512(3) with the header micro-graphic is located at the other end of the second header region HR2 (not adjacent to the other end of the first header region HR1). In addition, the header block 512(2) of the graphical indicator 502 is a target header block with two header data micro-graphics.

Figure 10B:
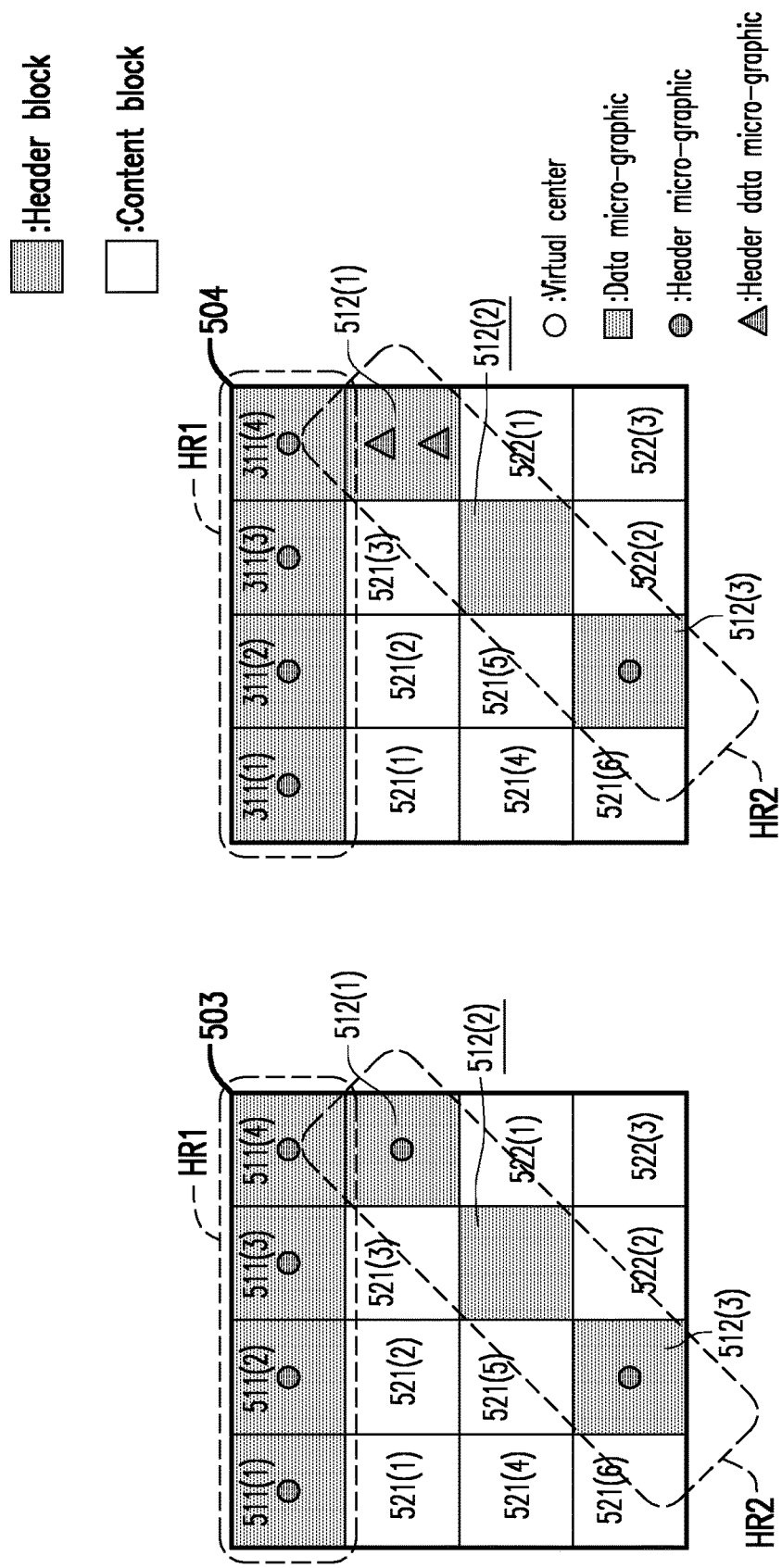
FIG. 10B is a schematic diagram of a graphical indicator according to an embodiment of the invention.

FIG. 10B is a schematic diagram of a graphical indicator according to an embodiment of the invention. Referring to FIG. 10B, the header blocks at two ends of the second header region HR2 of a graphical indicator 503 are the remaining header blocks 512(1) and 512(3) with the header micro-graphics. The target header block 512(2) without the header micro-graphic is not located at the two ends of the second header region HR2. In addition, the target header block 512(2) of the graphical indicator 503 is empty.

On the other hand, in the second header region HR2 of a graphical indicator 504, the header block adjacent to one end of the first header region HR1 is the target header block 512(1) with two header data micro-graphics, the header block at the other end of the second header region HR2 is the remaining header block 512(3) with the header micro-graphic. In addition, the target header block 512(2) in the middle of the second header region HR2 is empty.

Figure 11:
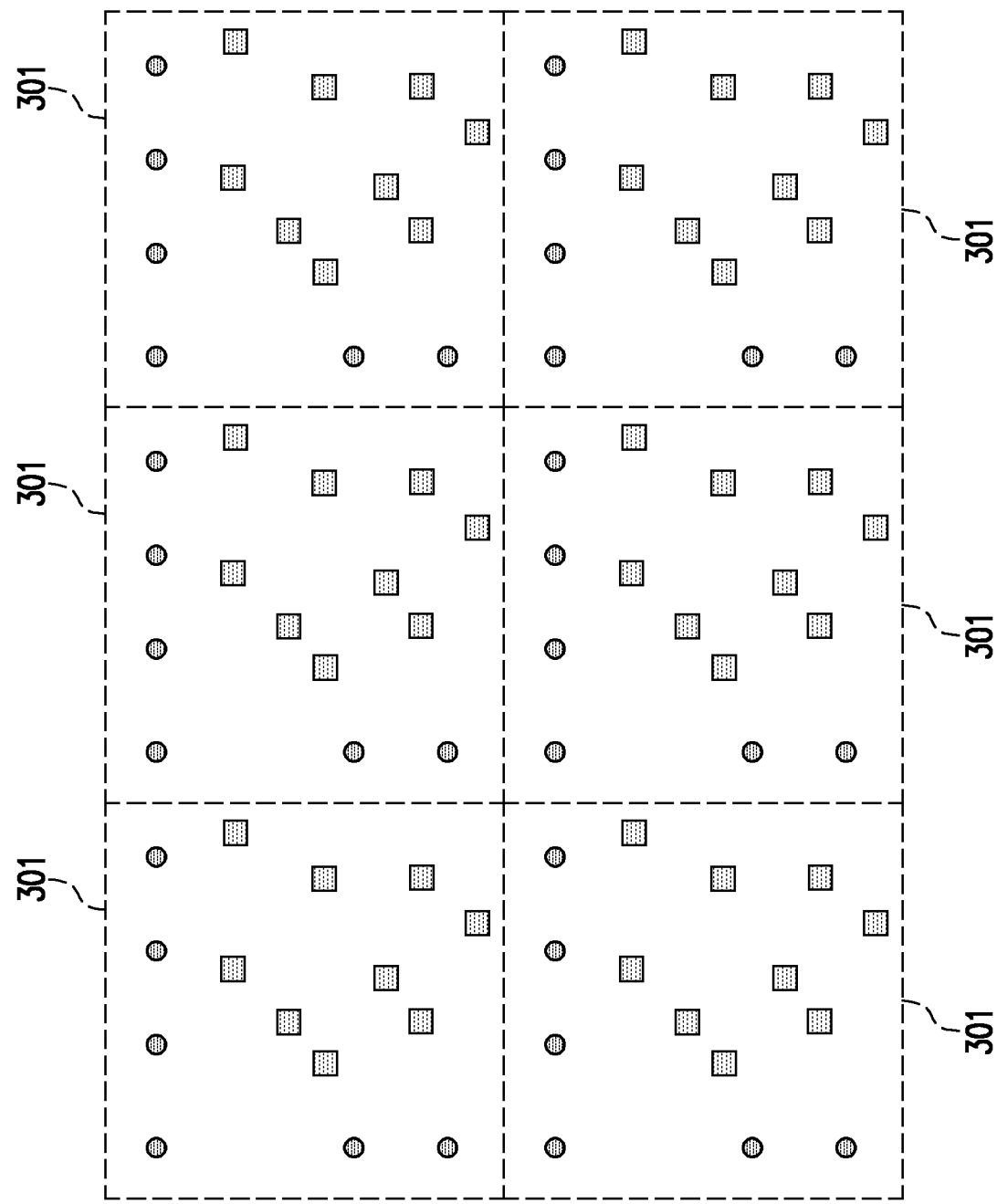
FIG. 11 is a schematic diagram of a plurality of adjacent graphical indicators according to an embodiment of the invention.

FIG. 11 is a schematic diagram of a plurality of adjacent graphical indicators according to an embodiment of the invention. As described above, the plurality of graphical indicators substantially printed on an object surface along with the main information only include a plurality of micro-graphics arranged in different regions. Referring to FIG. 11, for example, FIG. 11 is a schematic diagram of actually printing a plurality of adjacent graphical indicators 301 of FIG. 8A onto the object surface.

Figure 12:
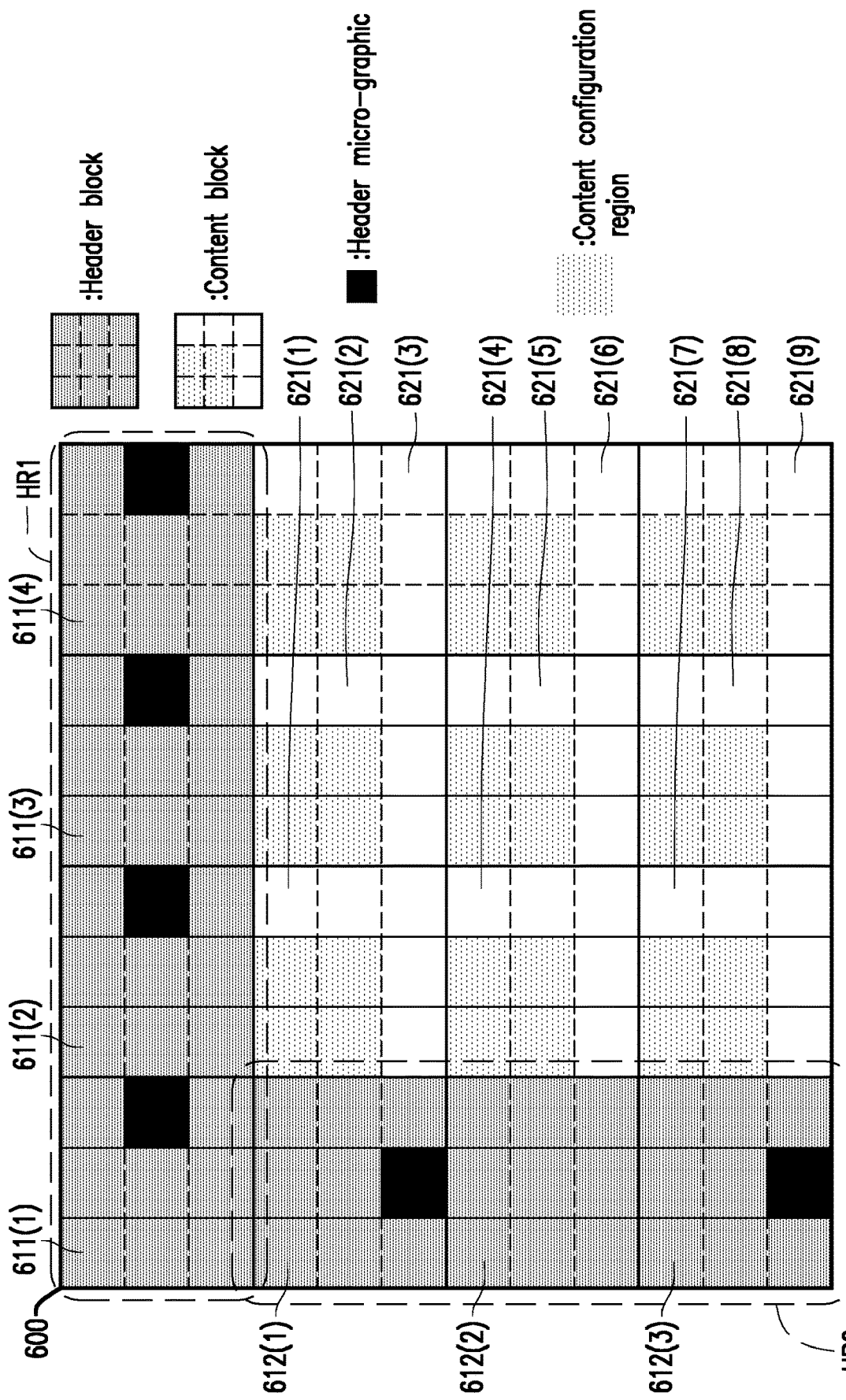
FIG. 12 is a schematic diagram of a graphical indicator according to an embodiment of the invention.

FIG. 12 is a schematic diagram of a graphical indicator according to an embodiment of the invention. Referring to FIG. 12, it is assumed that a graphical indicator 600 includes a first header region HR1 and a second header region HR2, and the graphical indicator 600 further includes a plurality of content blocks 621(1)-621(9). The header micro-graphics of the header blocks 611(1)-611(4) in the first header region HR1 of the graphical indicator 600 are respectively arranged at right edges of the header blocks 611(1)-611(4). The header micro-graphics of the remaining header blocks 612(1) and 612(3) at two ends of the second header region HR2 of the graphical indicator 600 are respectively arranged at lower edges of the header blocks 612(1), 612(3). In addition, the target header block 612(2) of the graphical indicator 600 is empty.

In the embodiment, a position of a content configuration region in each of the plurality of content blocks where the data micro-graphic may be arranged in the corresponding content block is predetermined by a position of each header micro-graphic of the first header region HR1 in the corresponding header block and a position of each header micro-graphic of the second header region HR2 in the corresponding header block. For example, as shown in FIG. 12, since each header micro-graphic in the first header region HR1 is at the "right" edge (an opposite side of the right edge is a "left" edge) of the corresponding header block and each header micro-graphic in the second header region HR2 is at the "lower" edge (an opposite side of the lower edge is an "upper" edge) of the corresponding header block, in each of the plurality of content blocks, the content configuration region where the data micro-graphic may be arranged is at an "upper left" portion of each content block (to avoid a right edge portion and a lower edge portion of each content block). Namely, the content configuration region of each content block is arranged on the opposite sides relative to the header micro-graphics in the first header region HR1 and the second header region HR2.

For another example, it is assumed that in another embodiment, each header micro-graphic in the first header region is at the "right" edge of the corresponding header block, and each header micro-graphic in the second header region is at the "upper" edge of the corresponding header block, the content configuration region of each content block may be predetermined at a "lower left" portion of each content block. For another example, it is assumed that in another embodiment, each header micro-graphic in the first header region is at the "left" edge of the corresponding header block and each header micro-graphic in the second header region is at the "upper" edge of the corresponding header block, the content allocation region of each content block may be predetermined at a "lower right" portion of each content block. For another example, it is assumed that in another embodiment, each header micro-graphic in the first header region is at the "left" edge of the corresponding header block, and each header micro-graphic in the second header region is at the "bottom" edge of the corresponding header block, the content configuration region of each content block may be predetermined at an "upper right" portion of each content block.

In summary, the graphical indicator provided by the invention includes a plurality of header blocks and a plurality of content blocks forming the indicator matrix, and a plurality of header micro-graphics and a plurality of data micro-graphics respectively arranged in the header blocks and the content blocks, where the header blocks are further divided into target header blocks and remaining header blocks different from the target header blocks, so as to strengthen the difference between the header blocks and the content blocks to enhance a recognition ability of the graphical indicator. In this way, through the aforementioned specific configuration, the graphical indicator provided by the invention may have a better recognition rate when the graphical indicator is captured by an electronic device to execute a corresponding image recognition operation, so as to accurately recognize the dot pattern codes recorded by the graphical indicator, and improve the efficiency of the image recognition operation performed by the electronic device.

What is claimed is:

1. A graphical indicator, comprising:
a plurality of blocks, wherein the blocks form an indicator matrix with a dimension of M×N, where M and N are respectively positive integers greater than 3, wherein the blocks comprise:
a plurality of header blocks, comprising N first header blocks and (M−1) second header blocks; and
a plurality of content blocks, wherein each of the content blocks has a data micro-graphic, and the content blocks are used to record dot pattern codes,
wherein the N first header blocks are disposed at a first row of the indicator matrix,
each of the (M−1) second header blocks is disposed at (M−1) rows other than the first row of the indicator matrix, wherein the content blocks are disposed at the (M−1) rows,
each of the N first header blocks has a header micro-graphic, and
one or more target second header blocks in the (M−1) second header blocks do not have the header micro-graphic, and each of a plurality of remaining second header blocks other than the one or more target second header blocks in the (M−1) second header blocks has the header micro-graphic.

2. The graphical indicator as claimed in claim 1, wherein each of the content blocks has V virtual regions, where V is a positive integer greater than or equal to 3,
wherein the data micro-graphic of each of the content blocks is selectively set in one of the V virtual regions of a content block to which the data micro-graphic belongs, so that each of the content blocks corresponds to a binary value.

3. The graphical indicator as claimed in claim 2, wherein the N first header blocks are arranged into a first header region in a linear form, and the (M−1) second header blocks are arranged into a second header region in the linear form,
wherein a first connection end in the first header region is adjacent to a second connection end of the second header region.

4. The graphical indicator as claimed in claim 3, wherein two end second header blocks located at two ends of the second header region in the (M−1) second header blocks comprise:
one of the remaining second header blocks and one of the one or more target second header blocks, wherein the one of the one or more target second header blocks is adjacent to the first header region; or
two of the remaining second header blocks.

5. The graphical indicator as claimed in claim 4, wherein each of the one or more target second header blocks belongs to one of following types:
a first type, wherein a target second header block belonging to the first type is empty, and
a second type, wherein a target second header block belonging to the second type has W virtual regions, where W is a positive integer greater than or equal to 2, wherein one or more of the W virtual regions are respectively configured with a header data micro-graphic, so that the target second header block belonging to the second type corresponds to a header data value, wherein the header data value comprises one or more of following information:
auxiliary header information; and
auxiliary data information.

6. The graphical indicator as claimed in claim 5, wherein the one or a more target second header blocks are used to assist determining a range and a direction of the graphical indicator.

7. The graphical indicator as claimed in claim 5, wherein the header micro-graphic is arranged in a block to which the header micro-graphic belongs.

8. The graphical indicator as claimed in claim 4, wherein one of the two end second header blocks is adjacent to one of two end first header blocks located at two ends of the first header region.

9. The graphical indicator as claimed in claim 4, wherein a total number of the header micro-graphics of the graphical indicator is less than (M+N−1), wherein a total number of the content blocks is equal to [M*N−(M+N−1)].

10. A graphical indicator, comprising:
a plurality of blocks, wherein the blocks form an indicator matrix with a dimension of M×N, where M and N are respectively positive integers greater than 3, wherein the blocks comprise:
   a plurality of header blocks, comprising M first header blocks and (N−1) second header blocks; and
   a plurality of content blocks, wherein each of the content blocks has a data micro-graphic, and the content blocks are used to record dot pattern codes,
wherein the M first header blocks are disposed at a first column of the indicator matrix,
each of the (N−1) second header blocks is disposed at (N−1) rows other than the first column of the indicator matrix, wherein the content blocks are disposed at the (N−1) rows,
each of the M first header blocks has a header micro-graphic, and
one or more target second header blocks in the (N−1) second header blocks do not have the header micro-graphic, and each of a plurality of remaining second header blocks other than the one or more target second header blocks in the (N−1) second header blocks has the header micro-graphic.

11. A graphical indicator, comprising:
a plurality of blocks, wherein the blocks form an indicator matrix with a dimension of M×N, where M and N are respectively positive integers greater than 3, wherein the blocks comprise:
   a plurality of header blocks, comprising N first header blocks and (M−1) second header blocks; and
   a plurality of content blocks, wherein each of the content blocks has a data micro-graphic, and the content blocks are used to record dot pattern codes,
wherein the N first header blocks are disposed at a first row of the indicator matrix,
the (M−1) second header blocks are disposed at (M−1) rows other than the first row of the indicator matrix, wherein the content blocks are disposed at the (M−1) rows,
each of the N first header blocks has a first header micro-graphic, wherein each of N first header micro-graphics are disposed at a first edge of a first header block to which the first header micro-graphic belongs,
one or more target second header blocks in the (M−1) second header blocks do not have the first header micro-graphic and a second header micro-graphic, and each of a plurality of remaining second header blocks other than the one or more target second header blocks in the (M−1) second header blocks has the second header micro-graphic, wherein each of the second header micro-graphics is disposed at a second edge of a remaining second header block to which the second header micro-graphic belongs, and
the data micro-graphic of each of the content blocks is disposed in a content configuration region of a content block to which the data micro-graphic belongs, and a position of the content configuration region in the content block is predetermined according to the first edge and the second edge.

\* \* \* \* \*